(12) United States Patent
Aiba et al.

(10) Patent No.: US 10,601,621 B2
(45) Date of Patent: Mar. 24, 2020

(54) USER EQUIPMENTS, BASE STATIONS AND METHODS

(71) Applicants: Sharp Kabushiki Kaisha, Sakai-ku, Sakai, Osaka (JP); FG Innovation Company Limited, New Territories, Hong Kong (CN)

(72) Inventors: Tatsushi Aiba, Vancouver, WA (US); Jia Sheng, Vancouver, WA (US); Toshizo Nogami, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 15/860,917

(22) Filed: Jan. 3, 2018

(65) Prior Publication Data
US 2018/0198657 A1    Jul. 12, 2018

Related U.S. Application Data

(63) Continuation of application No. PCT/US2018/012047, filed on Jan. 2, 2018.
(Continued)

(51) Int. Cl.
*H04L 27/26* (2006.01)
*H04L 5/00* (2006.01)
(Continued)

(52) U.S. Cl.
CPC ........ *H04L 27/2611* (2013.01); *H04L 5/0048* (2013.01); *H04L 5/0094* (2013.01);
(Continued)

(58) Field of Classification Search
CPC . H04W 72/042; H04W 28/18; H04L 27/2611; H04L 5/0048; H04L 5/0094; H04L 5/0007; H04L 5/001; H04L 5/0023
See application file for complete search history.

(56) References Cited

U.S. PATENT DOCUMENTS 9,214,997 B2   12/2015   Han et al.
2013/0039332 A1   2/2013   Nazar et al.
(Continued)

OTHER PUBLICATIONS

International Search Report and Written Opinion issued for PCT Application No. PCT/US2018/012047 dated Jun. 19, 2018.
(Continued)

*Primary Examiner* — Brian D Nguyen
(74) *Attorney, Agent, or Firm* — Austin Rapp

(57) ABSTRACT

A user equipment (UE) receives, from a base station apparatus (gNB), a radio resource control message including information used for configuring whether a first reference signal is used for uplink transmissions or a second reference signal is used for uplink transmissions. The first reference signal is a demodulation reference signal associated with a physical uplink shared channel. The second reference signal is a demodulation reference signal associated with a physical uplink shared channel. The UE also transmits, based on the information, to the gNB, the first reference signal on an antenna port. The UE transmits, based on the information, to the gNB, the second reference signal on the same antenna port as the antenna port on which the first reference signal is transmitted. The second reference signal is mapped to resource elements in a resource block, which are different from resource elements in a resource block to which the first reference signal is mapped.

4 Claims, 21 Drawing Sheets

2000

2002 — Receive, from a base station apparatus, a radio resource control message including information used for configuring whether a first reference signal is used for uplink transmissions or a second reference signal is used for the uplink transmissions 2004 — Transmit, based on the information, to the base station apparatus, the first reference signal on an antenna port 2006 — Transmit, based on the information, to the base station apparatus, the second reference signal on the same antenna port as the antenna port on which the first reference signal is transmitted

Related U.S. Application Data

(60) Provisional application No. 62/443,403, filed on Jan. 6, 2017.

(51) Int. Cl.
 _H04W 28/18_ (2009.01)
 _H04W 72/04_ (2009.01)

(52) U.S. Cl.
 CPC ......... _H04W 28/18_ (2013.01); _H04W 72/042_ (2013.01); *H04L 5/001* (2013.01); *H04L 5/0007* (2013.01); *H04L 5/0023* (2013.01)

(56) References Cited

U.S. PATENT DOCUMENTS

| | | | |
|---|---|---|---|
| 2013/0265978 | A1 | 10/2013 | Noh et al. |
| 2014/0233525 | A1 | 8/2014 | Kim et al. |
| 2014/0293881 | A1 | 10/2014 | Khoshnevis et al. |
| 2014/0321406 | A1 | 10/2014 | Marinier et al. |
| 2015/0055576 | A1 | 2/2015 | Zhang et al. |
| 2016/0142189 | A1* | 5/2016 | Shin ............... H04L 5/0048 370/329 |
| 2017/0063503 | A1* | 3/2017 | Liu ............... H04L 5/0044 |
| 2017/0070276 | A1* | 3/2017 | Kim ............... H04B 7/0413 |
| 2017/0134080 | A1* | 5/2017 | Rahman ............ H04B 7/0456 |
| 2018/0034525 | A1* | 2/2018 | Park ............... H04L 5/00 |
| 2018/0175983 | A1* | 6/2018 | Yum ............... H04L 5/0057 |
| 2018/0199268 | A1* | 7/2018 | Wang ............... H04W 48/12 |
| 2018/0212800 | A1* | 7/2018 | Park ............... H04L 1/00 |
| 2018/0310283 | A1* | 10/2018 | Deenoo ........... H04W 72/042 |

OTHER PUBLICATIONS

3GPP TS 36.211 V14.0.0, Evolved Universal Terrestrial Radio Access (E-UTRA); Physical channels and modulation (Release 14) Sep. 2016.

3GPP TS 36.213 V14.0.0, Evolved Universal Terrestrial Radio Access (E-UTRA); Physical layer procedures (Release 14) Sep. 2016.

Change Request, 3GPP TSG RAN WG1 Meeting #54, R1-082866, Jeju, Korea Aug. 22, 2008.

Motorola, "Indication of UE Antenna Selection for PUSCH", 3GPP TSG RAN WG1 #52, R1-080721, Sorrento, Italy Feb. 15, 2008.

* cited by examiner

USER EQUIPMENTS, BASE STATIONS AND METHODS

RELATED APPLICATIONS

This application is related to and claims priority from U.S. Provisional Patent Application No. 62/443,403, entitled "USER EQUIPMENTS, BASE STATIONS AND METHODS," filed on Jan. 6, 2017, which is hereby incorporated by reference herein, in its entirety.

TECHNICAL FIELD

The present disclosure relates generally to communication systems. More specifically, the present disclosure relates to new signaling, procedures, user equipment (UE) and base stations for user equipments, base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
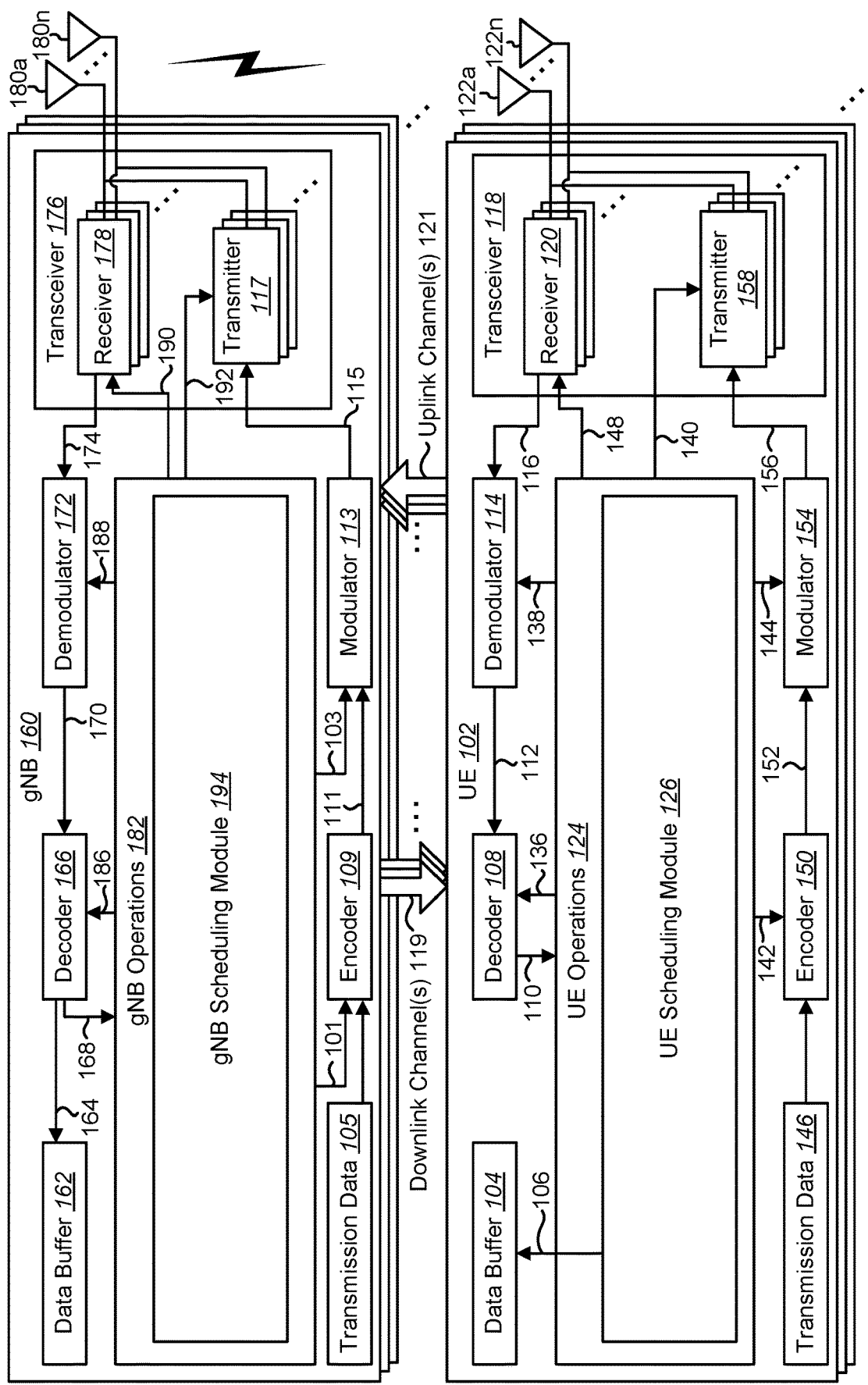
FIG. 1 is a block diagram illustrating one implementation of one or more base station apparatuses (gNBs) and one or more user equipments (UEs) in which systems and methods for uplink transmission may be implemented.

A user equipment is described. The user equipment includes receiving circuitry configured to receive, from a base station apparatus, a radio resource control message including information used for configuring whether a first reference signal is used for uplink transmissions or a second reference signal is used for the uplink transmissions. The first reference signal is a demodulation reference signal associated with a physical uplink shared channel. The second reference signal is a demodulation reference signal associated with a physical uplink shared channel. The user equipment also includes transmitting circuitry configured to transmit, based on the information, to the base station apparatus, the first reference signal on an antenna port. The transmitting circuitry is configured to transmit, based on the information, to the base station apparatus, the second reference signal on the same antenna port as the antenna port on which the first reference signal is transmitted. The second reference signal is mapped to resource elements in a resource block, which are different from resource elements in a resource block to which the first reference signal is mapped.

A reference signal sequence of the first reference signal and a reference signal sequence of the second reference signal may be generated based on a first value in a case that the first value is configured by using the radio resource control message. The reference signal sequence of the first reference signal and the reference signal sequence of the second reference signal may be generated based on a physical cell identity in a case that no first value is configured by using the radio resource control message.

A base station apparatus is also described. The base station apparatus includes transmitting circuitry configured to transmit, to a user equipment, a radio resource control message including information used for configuring whether a first reference signal is used for uplink transmissions or a second reference signal is used for the uplink transmissions. The first reference signal is a demodulation reference signal associated with a physical uplink shared channel. The second reference signal is a demodulation reference signal associated with a physical uplink shared channel. The base station apparatus also includes receiving circuitry configured to receive, based on the information, from the user equipment, the first reference signal on an antenna port. The receiving circuitry is configured to receive, based on the information, from the user equipment, the second reference signal on the same antenna port as the antenna port on which the first reference signal is received. The second reference signal is mapped to resource elements in a resource block, which are different from resource elements in a resource block to which the first reference signal is mapped.

A communication method of a user equipment is also described. The method includes receiving, from a base station apparatus, a radio resource control message including information used for configuring whether a first reference signal is used for uplink transmissions or a second reference signal is used for the uplink transmissions. The first reference signal is a demodulation reference signal associated with a physical uplink shared channel. The second reference signal is a demodulation reference signal associated with a physical uplink shared channel. The method may also include transmitting, based on the information, to the base station apparatus, the first reference signal on an antenna port. The method may further include transmitting, based on the information, to the base station apparatus, the second reference signal on the same antenna port as the antenna port on which the first reference signal is transmitted. The second reference signal is mapped to resource elements in a resource block, which are different from resource elements in a resource block to which the first reference signal is mapped.

A communication method of a base station apparatus is also described. The method includes transmitting, to a user equipment, a radio resource control message including information used for configuring whether a first reference signal is used for uplink transmissions or a second reference signal is used for the uplink transmissions. The first reference signal is a demodulation reference signal associated with a physical uplink shared channel. The second reference signal is a demodulation reference signal associated with a physical uplink shared channel. The method also includes receiving, based on the information, from the user equipment, the first reference signal on an antenna port. The method further includes receiving, based on the information, from the user equipment, the second reference signal on the same antenna port as the antenna port on which the first reference signal is received. The second reference signal is mapped to resource elements in a resource block, which are different from resource elements in a resource block to which the first reference signal is mapped.

Another user equipment (UE) is described. The UE includes receiving circuitry that receives first information, second information, third information and fourth information. The UE also includes transmitting circuitry that transmits on an uplink (UL) antenna port, a demodulation reference signal associated with a physical uplink shared channel. For first transmission of the demodulation reference signal on the UL antenna port, a first demodulation reference signal sequence of the demodulation reference signal that is generated based on the first information is used and the demodulation reference signal is mapped to a first position of the resource elements determined based on the third information. For second transmission of the demodulation reference signal on the UL antenna port, a second demodulation reference signal sequence of the demodulation reference signal that is generated based on the second information is used and the demodulation reference signal is mapped to a second position of the resource elements determined based on the fourth information.

A base station apparatus is also described. The base station apparatus includes transmitting circuitry that transmits first information, second information, third information and fourth information. The base station apparatus also includes receiving circuitry that receives, a demodulation reference signal associated with a physical uplink shared channel. For first transmission of the demodulation reference signal on an UL antenna port, a first demodulation reference signal sequence of the demodulation reference signal that is generated based on the first information is used the demodulation reference signal is mapped to a first positions of the resource elements determined based on the third information. For second transmission of the demodulation reference signal on the UL antenna port, a second demodulation reference signal sequence of the demodulation reference signal that is generated based on the second information is used and the demodulation reference signal is mapped to a second positions of the resource elements determined based on the fourth information.

A method of a UE is also described. The method includes receiving first information, second information, third information and fourth information. The method also includes transmitting on an UL antenna port, a demodulation reference signal associated with a physical uplink shared channel. For first transmission of the demodulation reference signal on the UL antenna port, a first demodulation reference signal sequence of the demodulation reference signal that is generated based on the first information is used and the demodulation reference signal is mapped to a first position of the resource elements determined based on the third information. For second transmission of the demodulation reference signal on the UL antenna port, a second demodulation reference signal sequence of the demodulation reference signal that is generated based on the second information is used and the demodulation reference signal is mapped to a second position of the resource elements determined based on the fourth information.

A method of a base station apparatus is also described. The method includes transmitting first information, second information, third information and fourth information. The method also includes receiving a demodulation reference signal associated with a physical uplink shared channel. For first transmission of the demodulation reference signal on an UL antenna port, a first demodulation reference signal sequence of the demodulation reference signal that is generated based on the first information is used the demodulation reference signal is mapped to a first positions of the resource elements determined based on the third information. For second transmission of the demodulation reference signal on the UL antenna port, a second demodulation reference signal sequence of the demodulation reference signal that is generated based on the second information is used and the demodulation reference signal is mapped to a second positions of the resource elements determined based on the fourth information.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra-Reliable and Low Latency Communication) transmission, and eMTC (massive Machine Type Communication) transmission. Also, in NR, single-beam and/or multi-beam operations is considered for downlink and/or uplink transmissions.

In order for the services to use the time/frequency/space resource efficiently, it would be useful to be able to efficiently control uplink transmissions. Therefore, a procedure for efficient control of uplink transmissions should be designed. However, the detailed design of a procedure for uplink transmissions has not been studied yet.

According to the systems and methods described herein, a UE may transmit multiple reference signals (RSs) associated with one or more Transmission Reception Points (TRPs) on a UL antenna port. For example, multiple UL RSs respectively associated with one or more TRPs may be transmitted on a UL antenna port. Namely, there may be one or more UL RSs transmitted per UL antenna port. Also, there may be one or more UL RSs transmitted per TRP.

In an example, one TRP may be associated with one UL antenna port. In another example, one TRP may be associated with multiple UL antenna port(s). In another example, multiple TRP(s) may be associated with multiple UL antenna port(s). In yet another example multiple antenna port(s) may be associated with one UL antenna port. The TRP(s) described herein are assumed to be included in the antenna port(s) for the sake of simple description.

Here, for example, multiple UL RSs transmitted on an UL antenna port may be defined by a same sequence (e.g., a demodulation reference signal sequence, and/or a reference signal sequence). For example, the same sequence may be generated based on a first parameter configured by a higher layer. The first parameter may be associated with a cyclic shift, and/or information associated with a beam index.

Or, multiple UL RSs transmitted on an UL antenna port may be identified by a different sequence. Each of the different signal sequence may be generated based on each of more than one second parameter(s) configured by a higher layer. One second parameter among more than one second parameters may be indicated by Downlink Control Information (DCI). Each of the second parameters may be associated with a cyclic shift, and/or information associated with a beam index.

Also, resource element(s) to which multiple UL RSs transmitted on a UL antenna port are mapped may be defined by the same value of a frequency shift. For example, the same value of the frequency shift may be given by a third parameter configured by a higher layer. The third information may be associated with a beam index.

Alternatively, resource element(s) to which multiple UL RSs transmitted on a UL antenna port are mapped may be identified by different values of a frequency shift. Each of the different values of the frequency shift may be given by each of more than one fourth parameter(s) configured by a higher layer. One fourth parameter among more than one parameters may be indicated by DCI. Each of the fourth parameters may be associated with a beam index.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for uplink transmission may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)), and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel), and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling module 126.

The UE scheduling module 126 may perform uplink transmissions. The uplink transmissions include data transmission transmission) and/or uplink reference signal transmission.

In a radio communication system, physical channels (uplink physical channels and/or downlink physical channels) may be defined. The physical channels (uplink physical channels and/or downlink physical channels) may be used for transmitting information that is delivered from a higher layer. For example, PCCH (Physical Control Channel) may be defined. PCCH is used to transmit control information.

In uplink, PCCH (e.g., Physical Uplink Control Channel (PUCCH)) is used for transmitting Uplink Control Information (UCI). The UCI may include Hybrid Automatic Repeat Request (HARQ-ACK), Channel State information (CSI), and/or Scheduling Request (SR). The HARQ-ACK is used for indicating a positive acknowledgement (ACK) or a negative acknowledgment (NACK) for downlink data (i.e., Transport block(s), Medium Access Control Protocol Data Unit (MAC PDU), and/or Downlink Shared Channel (DL-SCH)). The CSI is used for indicating state of downlink channel. Also, the SR is used for requesting resources of uplink data (i.e., Transport block(s), MAC PDU, and/or Uplink Shared Channel (UL-SCH)).

In downlink, PCCH (e.g., Physical Downlink Control Channel (PDCCH)) may be used for transmitting Downlink Control Information (DCI). Here, more than one DCI formats may be defined for DCI transmission on the PCCH. Namely, fields may be defined in the DCI format, and the fields are mapped to the information bits (i.e., DCI bits). For example, a DCI format 1A that is used for scheduling of one physical shared channel (PSCH) (e.g., PDSCH, transmission of one downlink transport block) in a cell is defined as the DCI format for the downlink.

Also, for example, a DCI format 0 that is used for scheduling of one PSCH (e.g., PUSCH, transmission of one uplink transport block) in a cell is defined as the DCI format for the uplink. For example, information associated with PSCH (a PDSCH resource, PUSCH resource) allocation, information associated with modulation and coding scheme (MCS) for PSCH, and DCI such as Transmission Power Control (TPC) command for PSCH and/or PCCH are included the DCI format. Also, the DCI format may include information associated with a beam index and/or an antenna port. The beam index may indicate a beam used for downlink transmissions and uplink transmissions. The antenna port may include DL antenna port and/or UL antenna port.

Also, for example, PSCH may be defined. For example, in a case that the downlink PSCH resource (e.g., PDSCH resource) is scheduled by using the DCI format, the UE 102 may receive the downlink data, on the scheduled downlink PSCH resource. Also, in a case that the uplink PSCH resource (e.g., PUSCH resource) is scheduled by using the DCI format, the UE 102 transmits the uplink data, on the scheduled uplink PSCH resource. Namely, the downlink PSCH is used to transmit the downlink data. And, the uplink PSCH is used to transmit the uplink data.

Furthermore, the downlink PSCH and the uplink PSCH are used to transmit information of higher layer (e.g., Radio Resource Control (RRC)) layer, and/or MAC layer). For example, the downlink PSCH and the uplink PSCH are used to transmit RRC message (RRC signal) and/or MAC Control Element (MAC CE). Here, the RRC message that is transmitted from the gNB 160 in downlink may be common to multiple UEs 102 within a cell (referred as a common RRC message). Also, the RRC message that is transmitted from the gNB 160 may be dedicated to a certain UE 102 (referred as a dedicated RRC message). The RRC message and/or the MAC CE are also referred to as a higher layer signal.

Furthermore, in the radio communication for uplink, UL RS(s) is used as uplink physical signal(s). The uplink physical signal is not used to transmit information that is provided from the higher layer, but is used by a physical layer. For example, the UL RS(s) may include the demodulation reference signal(s), the UE-specific reference signal (s), the sounding reference signal(s), and/or the beam-specific reference signal(s). The demodulation reference signal(s) may include demodulation reference signal(s) associated with transmission of uplink physical channel (e.g., PUSCH and/or PUCCH).

Also, the UE-specific reference signal(s) may include reference signal(s) associated with transmission of uplink physical channel (e.g., PUSCH and/or PUCCH). For example, the demodulation reference signal(s) and/or the UE-specific reference signal(s) may be a valid reference for demodulation of uplink physical channel only if the uplink physical channel transmission is associated with the corresponding antenna port. The gNB 160 may use the demodulation reference signal(s) and/or the UE-specific reference signal(s) to perform (re)configuration of the uplink physical channels. The sounding reference signal may be used to measure an uplink channel state.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of uplink transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding.

For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
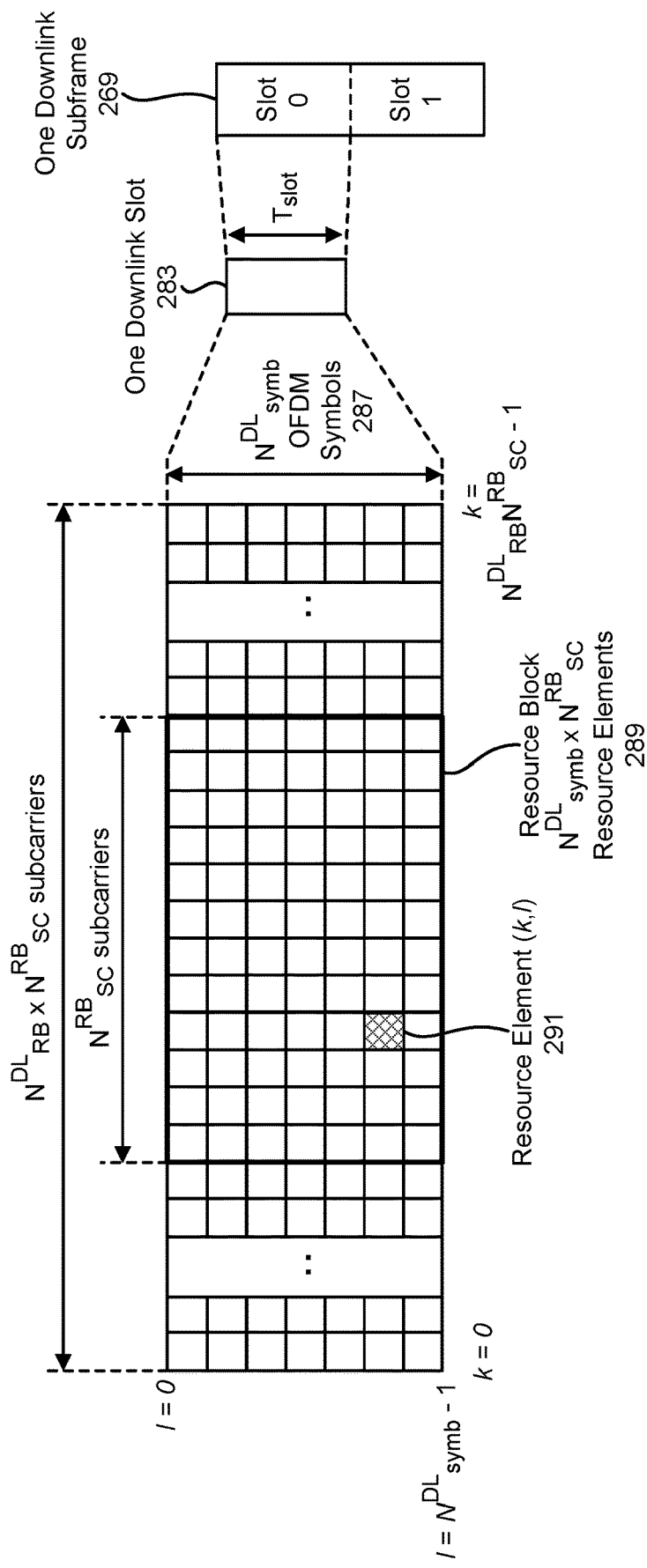
FIG. 2 is a diagram illustrating one example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of Orthogonal Frequency Domain Multiplexing (OFDM) symbols 287 in a downlink slot 283. A resource block 289 may include a number of resource elements (RE) 291.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 291 may be the RE 291 whose index l fulfils l≥$l_{data,start}$ and/or $l_{data,end}$≥l in a subframe.

In the downlink, the OFDM access scheme with cyclic prefix (CP) may be employed, which may be also referred to as CP-OFDM. In the downlink, PDCCH, EPDCCH (Enhanced Physical Downlink Control Channel), PDSCH and the like may be transmitted. A downlink radio frame may consist of multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
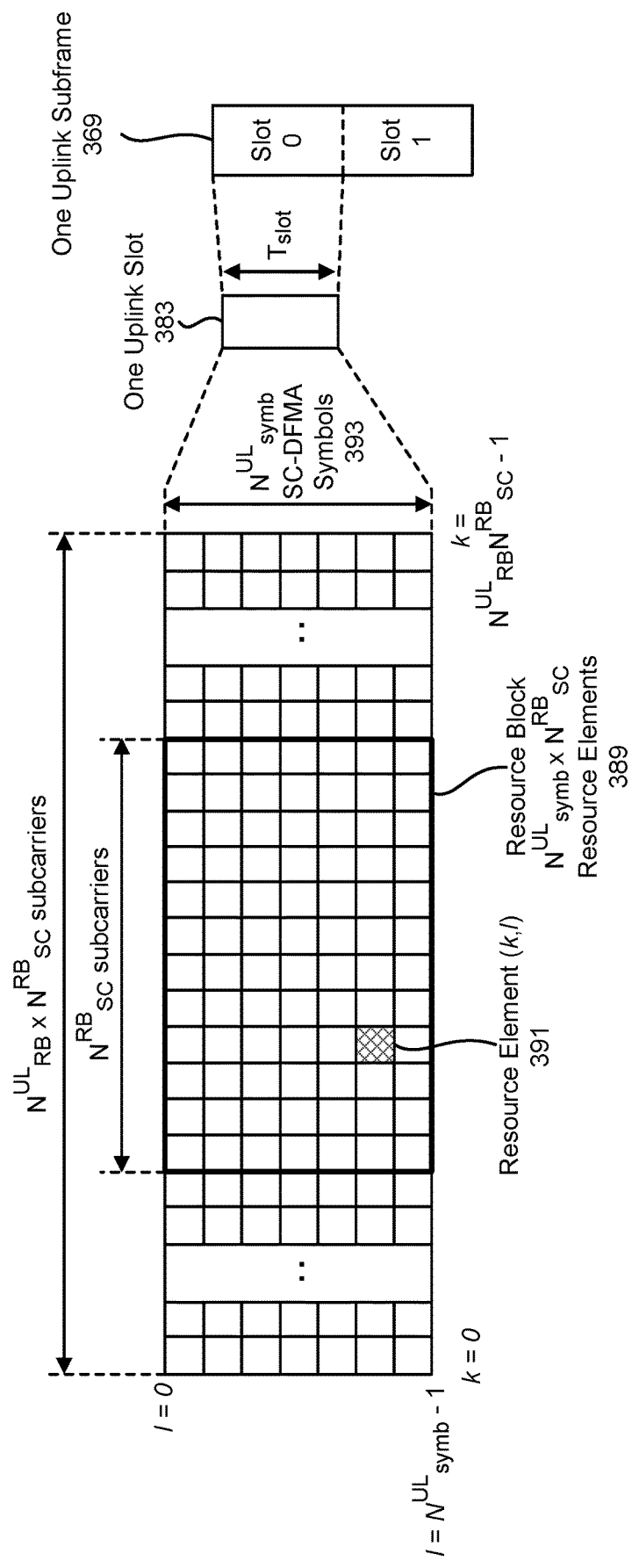
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, Physical Random Access Channel (PRACH) and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. The uplink RB pair consists of two uplink RBs that are continuous in the time domain.

The uplink RB may consist of twelve sub-carriers in frequency domain and seven (for normal CP) or six (for extended CP) OFDM/discrete Fourier transform spread OFDM (DFT-S-OFDM) symbols in time domain. A region defined by one sub-carrier in the frequency domain and one OFDM/DFT-S-OFDM symbol in the time domain is referred to as a resource element (RE) and is uniquely identified by the index pair (k,l) in a slot, where k and l are indices in the frequency and time domains respectively. While uplink subframes in one component carrier (CC) are discussed herein, uplink subframes are defined for each CC.

Figure 4:
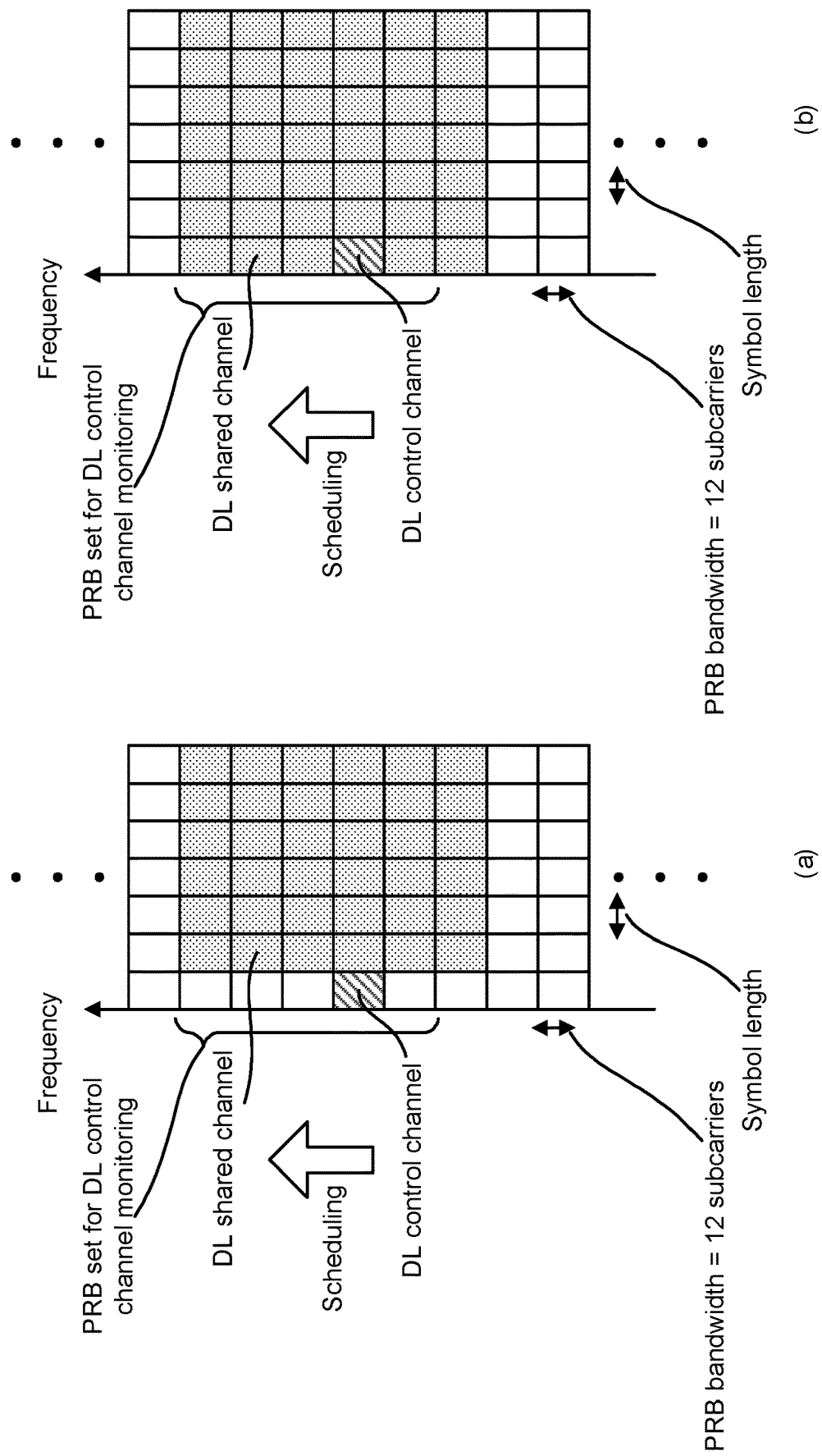
FIG. 4 shows examples of downlink (DL) control channel monitoring regions.

FIG. 4 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information (i.e., monitor downlink control information (DCI)), where the PRBs may or may not be frequency contiguous, a UE 102 may have one or more control resource sets, and one DCI message may be located within one control resource set. In the frequency-domain, a PRB is the resource unit size (which may or may not include DeModulation Reference Signal (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Namely, the UE 102 may monitor a set of PCCH (e.g., PDCCH) candidates. Here, the PCCH candidates may be candidates for which the PCCH may possibly be assigned and/or transmitted. A PCCH candidate is composed of one or more control channel elements (CCEs). The term "monitor" means that the UE 102 attempts to decode each PDCCH in the set of PDCCH candidates in accordance with all the DCI formats to be monitored.

The set of PDCCH candidates that the UE 102 monitors may be also referred to as a search space. That is, the search space is a set of resource that may possibly be used for PCCH transmission.

Furthermore, a common search space (CSS) and a user-equipment search space (USS) are set (or defined, configured) in the PCCH resource region. For example, the CSS may be used for transmission of DCI to a plurality of the UEs 102. That is, the CSS may be defined by a resource common to a plurality of the UEs 102. For example, the CSS is composed of CCEs having numbers that are predetermined between the gNB 160 and the UE 102. For example, the CSS is composed of CCEs having indices 0 to 15.

Here, the CSS may be used for transmission of DCI to a specific UE 102. That is, the gNB 160 may transmit, in the CSS, DCI format(s) intended for a plurality of the UEs 102 and/or DCI format(s) intended for a specific UE 102.

The USS may be used for transmission of DCI to a specific UE 102. That is, the USS is defined by a resource dedicated to a certain UE 102. That is, the USS may be defined independently for each UE 102. For example, the USS may be composed of CCEs having numbers that are determined based on a Radio Network Temporary Identifier (RNTI) assigned by the gNB 160, a slot number in a radio frame, an aggregation level, or the like.

Here, the RNTI(s) may include C-RNTI (Cell-RNTI), Temporary C-RNTI. Also, the USS (the position(s) of the USS) may be configured by the gNB 160. For example, the gNB 160 may configure the USS by using the RRC message. That is, the base station may transmit, in the USS, DCI format(s) intended for a specific UE 102.

Here, the RNTI assigned to the UE 102 may be used for transmission of DCI (transmission of PCCH). Specifically, CRC (Cyclic Redundancy Check) parity bits (also referred to simply as CRC), which are generated based on DCI (or DCI format), are attached to DCI, and, after attachment, the CRC parity bits are scrambled by the RNTI. The UE 102 may attempt to decode DCI to which the CRC parity bits scrambled by the RNTI are attached, and detects PCCH (i.e., DCI, DCI format). That is, the UE 102 may decode PCCH with the CRC scrambled by the RNTI.

Figure 5:
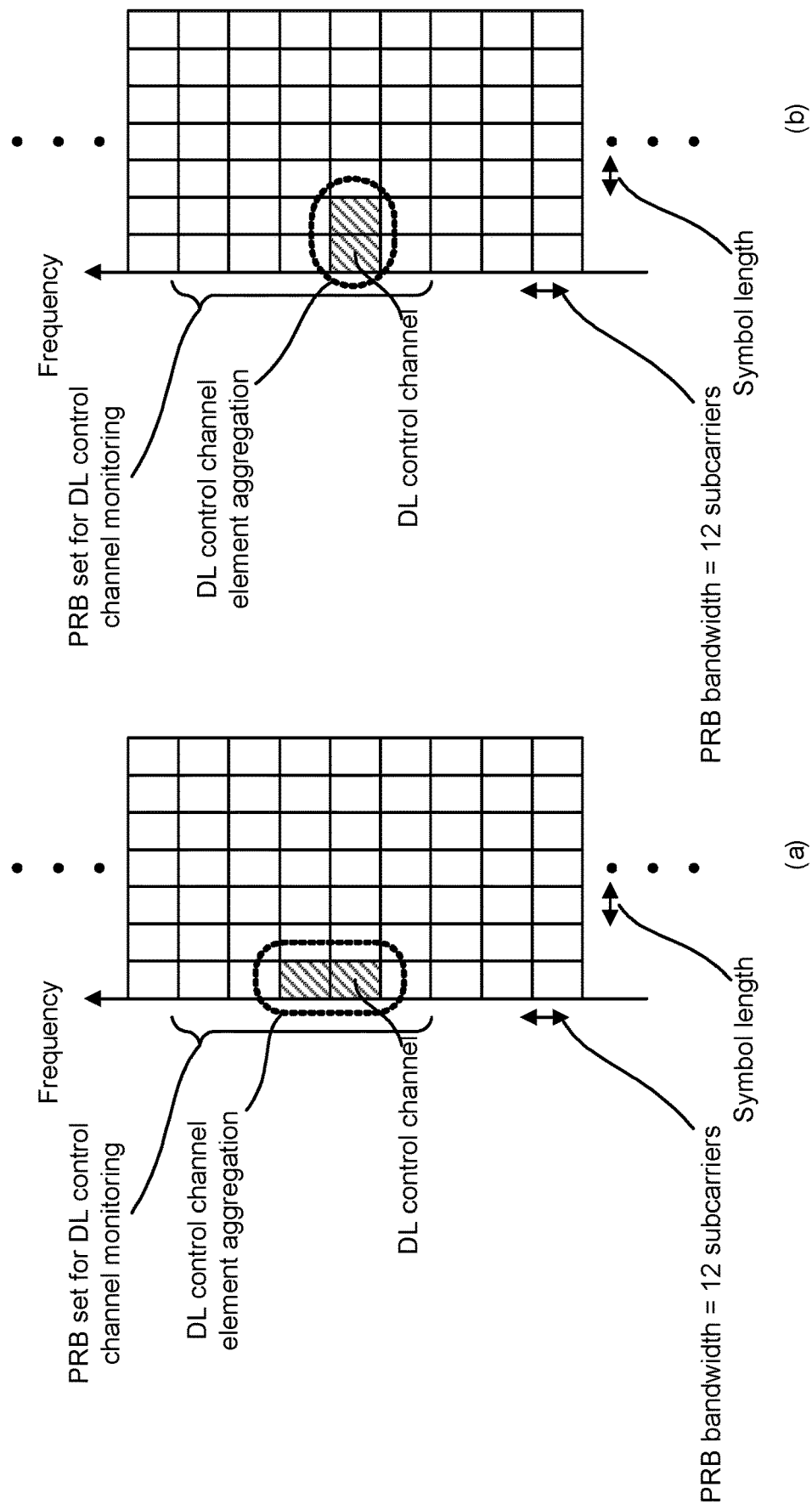
FIG. 5 shows examples of DL control channel which consists of more than one control channel elements.

FIG. 5 shows examples of DL control channel which consists of more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 6:
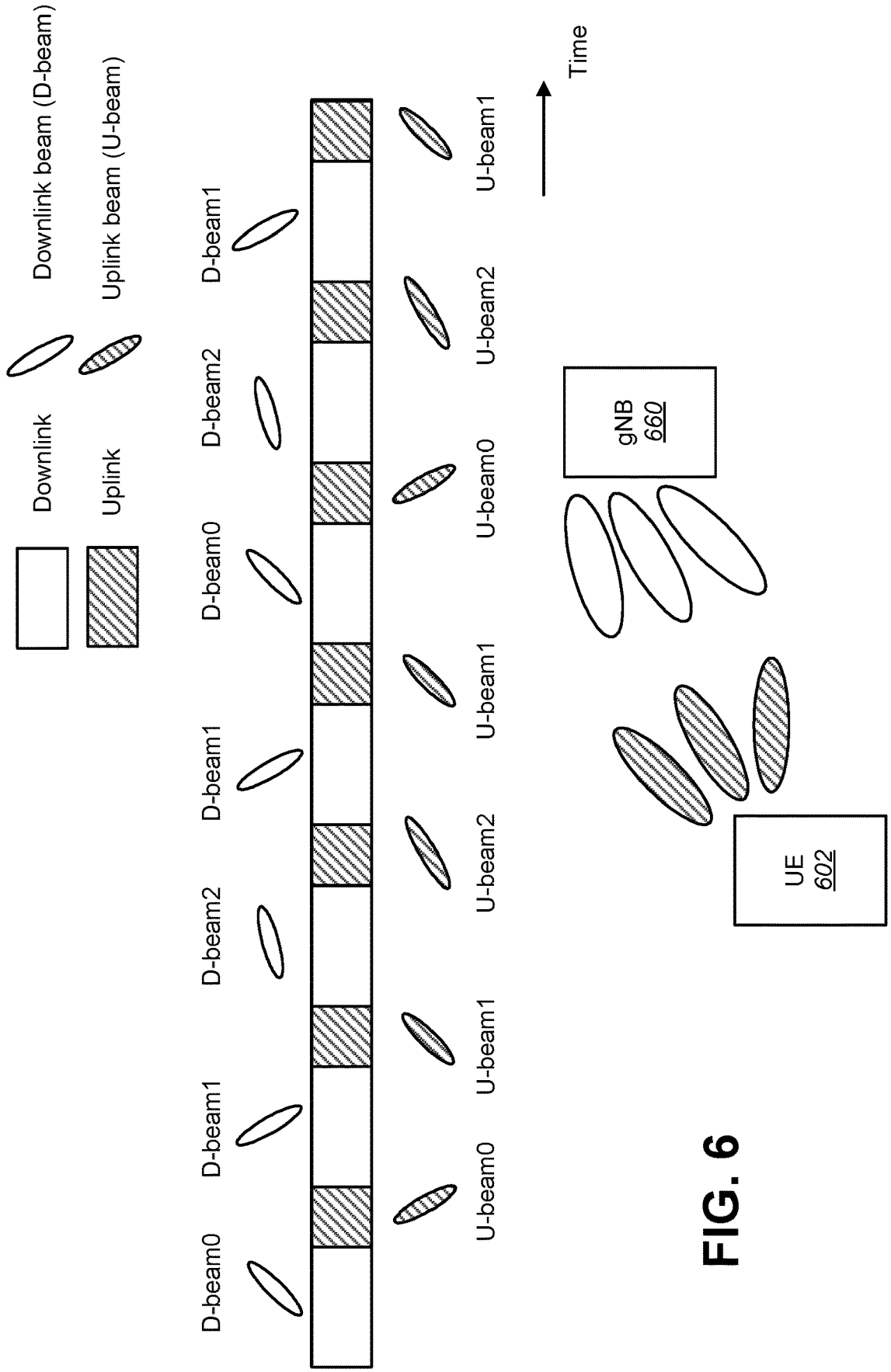
FIG. 6 illustrates an example of uplink (UL) transmissions.

FIG. 6 illustrates an example of uplink (UL) transmissions. As shown by the FIG. 6, the gNB 660 may perform downlink transmissions on beams with beam indices (e.g., D-beam0, D-beam1, and/or D-beam2). For example, the gNB 660 may semi-statically or dynamically switch D-beams for downlink transmissions. Also, the UE 602 may perform uplink transmissions on beams with beam indices (U-beam0, U-beam1, and/or U-beam2). For example, the UE 602 may semi-statically or dynamically switch U-beams for uplink transmissions.

Here, a linkage of D-beam and U-beam (a pair of D-beam and U-beam) may be defined. For example, the gNB 660 may configure the linkage of D-beam and U-beam by using the RRC message. For example, the linkage of D-beam0 and U-beam0 may be configured. Also, the linkage of D-beam1 and U-beam1 may be configured. Also, the linkage of D-beam2 and U-beam2 may be configured. For example, the UE 602 may perform uplink transmission on the beam with U-beam0 based on a detection of downlink transmission on the beam with D-beam0. Here, one or more D-beams may be associated with one or more Transmission Reception Points (TRPs), one or more DL antenna ports, and/or one or more UL antenna ports. Also, one or more U-beams may be associated with one or more TRPs, one or more DL antenna ports, and/or one or more UL antenna ports.

Here, the UE 602 may transmit the UL RS(s) associated with the TRP(s) on the UL antenna port(s). Here, the UL RS(s) may include the demodulation reference signal(s), the UE-specific reference signal(s), the sounding reference signal(s), and/or the beam-specific reference signal(s). The demodulation reference signal (s) may include demodulation reference signal(s) associated with transmission of uplink physical channel (e.g., PUSCH and/or PUCCH). Also, the UE-specific reference signal(s) may include reference signal(s) associated with transmission of uplink physical channel (e.g., PUSCH and/or PUCCH). For example, the demodulation reference signal(s) and/or the UE-specific reference signal(s) may be a valid reference for demodulation of uplink physical channel only if the uplink physical channel transmission is associated with the corresponding antenna port.

An antenna port may be defined such that the channel over which a symbol on the antenna port is conveyed can be inferred from the channel over which another symbol on the same antenna port is conveyed. For example, an antenna port is identified based on an antenna port index (i.e., a number of antenna port, an antenna port number). Different antenna ports may be used for different physical channels and signals. For UL RS(s), there may be limit which the channel can be inferred from one symbol to another symbol on the same antenna port. There may be one resource grid per antenna port. The set of antenna ports supported depends on the reference signal configuration (e.g., UL RS(s) used for uplink transmissions) in the serving cell.

Therefore, there may be one or more UL RSs transmitted per an UL antenna port. Also, there may be one or more UL RSs transmitted per TRP. For example, one TRP may be associated with one UL antenna port. Also, one TRP may be associated with multiple UL antenna port(s). Also, multiple TRP(s) may be associated with multiple UL antenna port(s). Also, multiple antenna port(s) may be associated with one UL antenna port. The TRP(s) hereinafter included in the antenna port(s) for the sake of simple description.

Multiple UL RSs may be transmitted on a same single antenna port. Here, multiple UL RSs may be transmitted in different timings (e.g., different subframes, and/or different slots). For example, a first UL RS (for example, UL RS1) may be transmitted in a first timing on a certain antenna port, and a second UL RS (for example, UL RS2) is transmitted in a second timing on the same antenna port as the certain antenna port. Also, multiple UL RSs may be transmitted in a same timing (e.g., a same subframe, and/or a same slot). For example, a first UL RS (for example, UL RS1) and a second UL RS (for example, UL RS2) may be transmitted in a first timing on a certain antenna port. Namely, multiple UL RSs corresponding PSCHs (e.g., PUSCHs) that are scheduled by using multiple DCI may be transmitted on a certain antenna port. The multiple DCI may be the same DCI or different DCI. Also, the multiple DCI may be detected in different timing. The multiple DCI may be used for scheduling of PSCHs in different transmission timings.

Here, the one or more UL RSs transmitted on an UL antenna port may be identified based on a first sequence (e.g., a demodulation reference signal sequence). Also, the one or more UL RSs transmitted on an UL antenna port may be identified based on a second sequence (e.g., a reference signal sequence). Also, the one or more UL RSs transmitted on an UL antenna port may be identified based on positions of resource element(s) to which the one or more UL RS(s) are mapped.

For example, the first sequence of UL RS(s) $r_{PUSCH}^{(\lambda)}(\cdot)$ associated with layer $\lambda \in \{0, 1, \ldots, \upsilon-1\}$ may be defined by:

$$r_{PUSCH}^{(\lambda)}(m \cdot M_{sc}^{RS}+n) = w^{(\lambda)}(m) r_{u,v}^{(\alpha_\lambda)}(n)$$

where
m=0, 1
n=0, ..., $M_{sc}^{RS}-1$
and
$M_{sc}^{RS} = M_{sc}^{PUSCH}$.

Here, $M_{sc}^{PUSCH}$ may indicate scheduled bandwidth for uplink transmission, expressed as a number of subcarriers. And, the orthogonal sequence $w^{(\lambda)}(m)$ may be given by DCI. Also, the cyclic shift $\alpha_\lambda$ in a slot $n_s$ may be given as $\alpha_\lambda = 2\pi n_{cs,\lambda}/12$ with:

$$n_{cs,\lambda} = (n_{DMRS}^{(1)} + n_{DMRS,\lambda}^{(2)} + n_{PN}(n_s)) \bmod 12$$

where the values of $n_{DMRS}^{(1)}$ may be given by higher layers, $n_{DMRS,\lambda}^{(2)}$ may be given by DCI.

The quantity $n_{PN}(n_s)$ may be given by:

$$n_{PN}(n_s) = \Sigma_{i=0}^{7} c(8N_{symb}^{UL} \cdot n_s + i) \cdot 2^i$$

where the pseudo-random sequence c(i) may be defined by a length-31 Gold sequence.

The output sequence c(n) of length $M_{PN}$, where n=0, 1, ..., $M_{PN}-1$, may be defined by:

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

where $N_C=1600$ and the first m-sequence shall be initialized with $x_1(0)=1$, $x_1(n)=0$, n=1, 2, ..., 30.

The initialization of the second m-sequence may be denoted by $c_{init} = \Sigma_{i=0}^{30} x_2(i) \cdot 2^i$ with the value depending on the application of the sequence. For example, the pseudo-random sequence generator may be initialized with $c_{init}$ at the beginning of each radio frame.

Here, the application of c(i) may be a cell-specific, a UE-specific, and/or a beam specific. Namely, for example, the quantity $c_{init}$ may be given by the following equation:

$$c_{init} = \left\lfloor \frac{N_{ID}^{cell}}{30} \right\rfloor \cdot 2^5 + ((N_{ID}^{cell} + \Delta_{ss}) \bmod 30)$$

where $\Delta_{ss} \in \{0, 1, \ldots, 29\}$ may be configured by higher layers.

Here, $N_{ID}^{cell}$ may indicate a physical cell identity (or a beam identity). The physical cell identity may be a cell-specific. The physical cell identity may be a physical identity of a cell. The beam identity may be a beam-specific and/or a TRP-specific. The beam identity described herein is assumed to be included in the physical cell identity for the sake of simple description. For example, the UE 602 may acquire (detect) the physical cell identity based on a synchronization signal. Also, the UE 602 may acquire (detect) the physical cell identity based on information (e.g., a handover command) included in a higher layer signal. Namely, the physical cell identity may be used as a parameter associated with the first sequence of UL RS(s).

Also, the physical cell identity may be used as a parameter associated with the cyclic shift of the first sequence of UL RS(s). Here, the same single physical cell identity may be used for generating each of the first sequences for the one or more UL RS(s) transmitted on an UL antenna port. Namely, the UE 602 may generate, based on the physical cell identity, each of the first sequences for the one or more UL RS(s). The UE 602 may generate, based on the physical cell identity, each of the first sequences for the one or more UL RS(s) if no value of first information and/or second information are configured by higher layers. Also, the UE 602 may generate, based on the physical cell identity, each of the first sequences for the one or more UL RS(s) if the uplink transmission corresponds to a Random Access Response Grant or a retransmission of the same transport block as part of the contention based random access procedure.

Here, the uplink transmission corresponds to the Random Access Response Grant may be PSCH transmission scheduled by using the Random Access Response Grant. For example, the Random Access Response Grant that is included in Random Access Response (i.e., Message 2) may be used for scheduling of a PSCH transmission (e.g., an initial PSCH transmission) in a random access procedure (e.g., an initial access procedure, a contention based random access procedure). Namely, the uplink transmission corresponds to the Random Access Response Grant may be a Message 3 transmission in the random access procedure.

Here, the Message 3 transmission may be performed in four steps random access procedure. And, the uplink transmission corresponding to the PSCH transmission may be performed as a Message 1 transmission in a case that a two steps random access procedure is applied.

Also, the uplink transmission corresponds to the retransmission of the same transport block may be PSCH transmission scheduled by using DCI including Temporary Cell-Radio Network Temporary Identifier (Temporary C-RNTI). For example, the DCI to which Cyclic Redundancy Check parity bits scrambled by the Temporary C-RNTI may be used for scheduling of a PSCH transmission (e.g., a PSCH retransmission) in the random access procedure.

Also, the UE 602 may generate, based on the physical cell identity, each of the first sequences for the one or more UL RS(s) if the PCCH (e.g., the PDCCH) is detected in the CSS. In this case, the detected PCCH (i.e., the detected DCI, the detected DCI format) may be used for scheduling of a corresponding PSCH (e.g., PUSCH).

Also, the UE 602 may generate, based on the physical cell identity, each of the first sequences for the one or more UL RS(s) if a specific DCI format is detected. Here, the specific DCI format may be specified, in advance, by specifications and known information between the gNB 660 and the UE 602. Namely, the UE 602 may generate, based on the physical cell identity, each of the first sequences for the one or more UL RS(s) if a predetermined DCI format is detected.

Here, the quantity $c_{init}$ may be given by the following equation:

$$c_{init} = \left\lfloor \frac{x}{30} \right\rfloor \cdot 2^5 + (x \bmod 30).$$

Here, a parameter x may be configured by higher layers. For example, the gNB 660 may configure the parameter x by using the first information included in the RRC message. Also, the parameter y may be indicated by DCI.

The parameter x may be a UE-specific. Here, the same single parameter x may be used for generating each of the first sequences for the one or more UL RS(s) transmitted on an UL antenna port. Namely, the UE 602 may generate, based on the parameter x, each of the first sequences for the one or more UL RS(s). Also, the UE 602 may generate, based on the parameter x, each of the first sequences for the one or more UL RS(s) if a value of the first information (i.e., a value of the parameter x) is configured. Also, the UE 602 may generate, based on the parameter x, each of the first sequences for the one or more UL RS(s) unless the uplink transmission corresponds to a Random Access Response Grant or a retransmission of the same transport block as part of the contention based random access procedure.

Also, the UE 602 may generate, based on the parameter x, each of the first sequences for the one or more UL RS(s) if the PCCH (e.g., the PDCCH) is detected in the CSS and/or the USS. In this case, the detected PCCH (i.e., the detected DCI, the detected DCI format) may be used for scheduling of a corresponding PSCH (e.g., PUSCH). Also, the UE 602 may generate, based on the parameter x, each of the first sequences for the one or more UL RS(s) if the specific DCI format and/or DCI format other than the specific DCI is detected. Namely, the UE 602 may generate, based on the parameter x, each of the first sequences for the one or more UL RS(s) if the predetermined DCI format and/or DCI format other than the predetermined DCI format is detected.

Also, the quantity $c_{init}$ may be given by the following equation:

$$c_{init} = \left\lfloor \frac{y}{30} \right\rfloor \cdot 2^5 + (y \bmod 30).$$

Here, the one or more parameters y may be configured by higher layers. For, example, the gNB 660 may configure the one or more parameters y by using the second information included in the RRC message. Also, the one or more parameters y may be indicated by DCI. And, the parameter y may be a UE-specific and/or a beam-specific. For example, the gNB 660 may configure more than one parameters y (e.g., up to four parameters y) by using the second information, and the UE 602 may use one parameter y among more than one parameters y based on DCI (or a higher layer parameter). As mentioned later, the gNB 660 may transmit the DCI (or the higher layer parameter) used for indicating that which beam index is used for uplink transmissions. Namely, the DCI used for indicating one parameter y may be included in DCI format mentioned later (e.g., DCI format Y and/or DCI format Z). Also, the higher layer parameter may be included in the RRC message.

Here, each of one or more parameters y may be used for generating each of the first sequences for the one or more corresponding UL RS(s) transmitted on an UL antenna port. For example, a parameter y1 may be used for generating the first sequence for an UL RS1. Also, a parameter y2 may be used for generating the first sequence for an UL RS2. Also, a parameter y3 may be used for generating the first sequence for an UL RS3. Namely, the UE 602 may generate, based on each of one or more parameters y, each of the first sequences for one or more corresponding UL RS(s) if a value of the second information (i.e., a value of the parameter y) is configured. Also, the UE 602 may generate, based on each of one or more parameters y, each of the first sequences for one or more corresponding UL RS(s) unless the uplink transmission corresponds to a Random Access Response Grant or a retransmission of the same transport block as part of the contention based random access procedure.

Also, the UE 602 may generate, based on each of one or more parameters y, each of the first sequences for the one or more UL RS(s) if the PCCH (e.g., the PDCCH) is detected in the USS. In this case, the detected PCCH (i.e., the detected DCI, the detected DCI format) may be used for scheduling of a corresponding PSCH (e.g., PUSCH). Also, the UE 602 may generate, based on each of one or more parameters y, each of the first sequences for the one or more UL RS(s) if DCI format other than the specific DCI format is detected. Namely, the UE 602 may generate, based on each of one or more parameters y, each of the first sequences for the one or more UL RS(s) if DCI format other than the predetermined DCI format is detected.

Therefore, the parameter x and the parameter y may be parameters associated with the first sequence of UL RS(s). Also, the parameter x and the parameter y may be parameters associated with the cyclic shift of the first sequence of UL RS(s). The parameter x and the parameter y may be parameters associated with a virtual cell identity and/or a beam index.

Also, a second sequence (e.g., a reference signal sequence) $r_{u,v}^{(\alpha)}(n)$ (i.e., $r_{u,v}^{(\alpha_\lambda)}(0), \ldots, r_{u,v}^{(\alpha_\lambda)}(M_{sc}^{RS}-1)$) may be defined by a cyclic shift $\alpha$ of a base sequence $\bar{r}_{u,v}(n)$ according to $$r_{u,v}^{(\alpha)}(n) = e^{j\alpha n} \bar{r}_{u,v}(n), \ 0 \leq n < M_{sc}^{RS}$$

where $M_{sc}^{RS} = mN_{sc}^{RB}$ may be the length of the reference signal sequence and $1 \leq m \leq N_{RB}^{max,UL}$. Multiple reference signal sequences may be defined from a single base sequence through different values of α.

Base sequences $\bar{r}_{u,v}(n)$ may be divided into groups, where $u \in \{0, 1, \ldots, 29\}$ may be the group number and v may be the base sequence number within the group, such that each group contains one base sequence (v=0) of each length $M_{sc}^{RS}=mN_{sc}^{RB}$, $1 \leq m \cdot 5$ and two base sequences (v=0, 1) of each length $M_{sc}^{RS}=mN_{sc}^{RB}$, $6 \leq m \leq N_{RB}^{max,UL}$. The sequence group number u and the number v within the group may vary in time respectively. The definition of the base sequence $\bar{r}_{u,v}(0), \ldots, \bar{r}_{u,v}(M_{sc}^{RS}-1)$ may depend on the sequence length $M_{sc}^{RS}$.

Here, the sequence-group number u in slot $n_s$ may be defined by a group hopping pattern $f_{gh}(n_s)$ and a sequence-shift pattern $f_{ss}$ according to $$u=(f_{gh}(n_s)+f_{ss}) \mod 30.$$

For example, there are 17 different hopping patterns and 30 different sequence-shift patterns. Sequence-group hopping can be enabled or disabled by means of the parameter Group-hopping-enabled provided by higher layers.

Here, the parameter Group-hopping-enabled is a cell-specific, a UE-specific, and/or a beam-specific. Namely, for example, the gNB 660 may configure the parameter Group-hopping-enabled included in the common RRC signal, and/or the dedicated RRC signal. Namely, the Sequence-group hopping can be enabled or disabled, by means of a single parameter Group-hopping-enabled, for one or more UL RSs transmitted on an UL antenna port. Also, the Sequence-group hopping can be enabled or disabled, by means of each of one or more parameters Group-hopping-enabled, for each of one or more corresponding UL RSs transmitted on an UL antenna port.

Also, sequence-group hopping for uplink transmission (e.g., PUSCH) can be disabled for a certain UE 602 through the higher-layer parameter Disable-sequence-group-hopping despite being enabled on a cell basis unless the PUSCH transmission corresponds to a Random Access Response Grant or a retransmission of the same transport block as part of the contention based random access procedure.

Here, the parameter Disable-sequence-group-hopping is a UE-specific, and/or a beam-specific. Namely, for, example, the gNB 660 may configure the parameter Disable-sequence-group-hopping included in the dedicated RRC signal. Namely, the Sequence-group hopping can be disabled, by means of a single parameter Disable-sequence-group-hopping, for one or more UL RSs transmitted on an UL antenna port. Also, the Sequence-group hopping can be disabled, by means of each of one or more Disable-sequence-group-hopping, for each of one or more corresponding UL RSs transmitted on an UL antenna port.

The group-hopping pattern $f_{gh}(n_s)$ may be given by $$f_{gh}(n_s) = \begin{cases} 0 & \text{if group hopping is disabled} \\ \left(\sum_{i=0}^{7} c(8n_s + i) \cdot 2^i\right) \mod 30 & \text{if group hopping is enabled} \end{cases}$$

where the pseudo-random sequence c(i) may be defined by same sequence as described herein. The pseudo-random sequence generator may be initialized with $$c_{init} = \left\lfloor \frac{N_{ID}^{RS}}{30} \right\rfloor$$

at the beginning of each radio frame.

Here, $n_{ID}^{RS}$ may be defined by $n_{ID}^{RS}=N_{ID}^{cell}$. Namely, the physical cell identity may be used as a parameter associated with the second sequence of UL RS(s). Also, the physical cell identity may be used as a parameter associated with the sequence group number of the second sequence of UL RS(s). Also, the physical cell identity may be used as a parameter associated with the sequence group hopping of the second sequence of UL RS(s). Here, the same single physical cell identity may be used for generating each of the second sequences for the one or more UL RS(s) transmitted on an UL antenna port. Namely, the UE 602 may generate, based on the physical cell identity, each of the second sequences for the one or more UL RS(s). The UE 602 may generate, based on the physical cell identity, each of the second sequences for the one or more UL RS(s) if no value of third information and/or fourth information are configured by higher layers. Also, the UE 602 may generate, based on the physical cell identity, each of the second sequences for the one or more UL RS(s) if the uplink transmission corresponds to a Random Access Response Grant or a retransmission of the same transport block as part of the contention based random access procedure.

Also, the UE 602 may generate, based on the physical cell identity, each of the second sequences for the one or more UL RS(s) if the PCCH (e.g., the PDCCH) is detected in the CSS. In this case, the detected PCCH (i.e., the detected DCI, the detected DCI format) may be used for scheduling of a corresponding PSCH (e.g., PUSCH). Also, the UE 602 may generate, based on the physical cell identity, each of the second sequences for the one or more UL RS(s) if the specific DCI format is detected. Namely, the UE 602 may generate, based on the physical cell identity, each of the second sequences for the one or more UL RS(s) if the predetermined DCI format is detected.

Also, $n_{ID}^{RS}$ may be defined by $n_{ID}^{RS}=z$. Here, the parameter z may be configured by higher layers. For, example, the gNB 660 may configure the parameter z by using the third information included in the dedicated RRC signal. Also, the parameter z may be indicated by DCI. The parameter z may be a UE-specific. Here, the same single parameter z may be used for generating each of the second sequences for the one or more UL RS(s) transmitted on an UL antenna port. Namely, the UE 602 may generate, based on the parameter z, each of the second sequences for the one or more UL RS(s). The UE 602 may generate, based on the parameter z, each of the second sequences for the one or more UL RS(s) if a value of the third information (i.e., a value of the parameter z) is configured. Also, the UE 602 may generate, based on the parameter z, each of the second sequences for the one or more UL RS(s) unless the uplink transmission corresponds to a Random Access Response Grant or a retransmission of the same transport block as part of the contention based random access procedure.

Also, the UE 602 may generate, based on the parameter z, each of the second sequences for the one or more UL RS(s) if the PCCH (e.g., the PDCCH) is detected in the CSS and/or the USS. In this case, the detected PCCH (i.e., the detected DCI, the detected DCI format) may be used for scheduling of a corresponding PSCH (e.g., PUSCH). Also, the UE 602 may generate, based on the parameter z, each of the first sequences for the one or more UL RS(s) if the specific DCI format and/or DCI format other than the specific DCI format is detected. Namely, the UE 602 may generate, based on the parameter z, each of the first sequences for the one or more UL RS(s) if the predetermined DCI format and/or DCI format other than the predetermined DCI format is detected.

Furthermore, $n_{ID}^{RS}$ may be defined by $n_{ID}^{RS}=k$. Here, the one or more parameters k may be configured by higher layers. For, example, the gNB 660 may configure the one or more parameters k by using the fourth information included in the RRC message. Also, the one or more parameters k may be indicated by DCI. And, the parameter k may be a UE-specific and/or a beam-specific. For example, the gNB 660 may configure more than one parameters k (up to four parameters k) by using the fourth information, and the UE 602 use one parameter k among more than one parameters k based on DCI (or the higher layer parameter). As mentioned in later, the gNB 660 may transmit the DCI (or the higher layer parameter) used for indicating that which beam index is used for uplink transmissions. Namely, the DCI used for indicating one parameter k may be included in DCI format mentioned later (e.g., DCI format Y and/or DCI format Z). Also, the higher layer parameter may be included in the RRC message.

Here, each of one or more parameters k may be used for generating each of the second sequences for the one or more corresponding UL RS(s) transmitted on an UL antenna port. For example, a parameter k1 may be used for generating the second sequence for an UL RS1. Also, a parameter k2 may be used for generating the second sequence for an UL RS2. Also, a parameter k3 may be used for generating the first sequence for an UL RS3. Namely, the UE 602 may generate, based on each of one or more parameters k, each of the second sequences for one or more corresponding UL RS(s) if a value of the fourth information (i.e., a value of the parameter k) is configured. Also, the UE 602 may generate, based on each of one or more parameters k, each of the second sequences for one or more corresponding UL RS(s) unless the uplink transmission corresponds to a Random Access Response Grant or a retransmission of the same transport block as part of the contention based random access procedure.

Also, the UE 602 may generate, based on each of one or more parameters k, each of the second sequences for the one or more UL RS(s) if the PCCH (e.g., the PDCCH) is detected in the USS. In this case, the detected PCCH (i.e., the detected DCI, the detected DCI format) may be used for scheduling of a corresponding PSCH (e.g., PUSCH). Also, the UE 602 may generate, based on each of one or more parameters k, each of the first sequences for the one or more UL RS(s) if DCI format other than the specific DCI format is detected. Namely, the UE 602 may generate, based on each of one or more parameters k, each of the first sequences for the one or more UL RS(s) if DCI format other than the predetermined DCI is detected.

Therefore, the parameter z and the parameter k may be associated with the second sequence of UL RS(s). Also, the parameter z and the parameter k may be associated with the sequence group number of the second sequence of UL RS(s). Also, the parameter z and the parameter k may be associated with the sequence group hopping of the second sequence of UL RS(s). The parameter z and the parameter k may be a parameter associated with a virtual cell identity and/or a beam index.

Here, the sequence-shift pattern $f_{ss}^{PUSCH}$ may be given by $f_{ss}^{PUSCH}=(N_{ID}^{cell}+\Delta_{ss})\mod 30$. Namely, the physical cell identity may be used as a parameter associated with the sequence-shift pattern of the second sequence of UL RS(s). Here, the same single physical cell identity may be used for determining each of the sequence-shift patterns for the one or more UL RS(s) transmitted on an UL antenna port. Namely, the UE 602 may determine, based on the physical cell identity, each of the sequence-shift patterns for the one or more UL RS(s) transmitted on an UL antenna port. The UE 602 may determine, based on the physical cell identity, each of the sequence-shift patterns for the one or more UL RS(s) if no value for third information and/or fourth information are configured by higher layers. Also, the UE 602 may generate, based on the physical cell identity, each of the sequence-shift patterns for the one or more UL RS(s) if the uplink transmission corresponds to a Random Access Response Grant or a retransmission of the same transport block as part of the contention based random access procedure.

Also, the UE 602 may generate, based on the physical cell identity, each of the sequence-shift patterns for the one or more UL RS(s) if the PCCH (e.g., the PDCCH) is detected in the CSS. In this case, the detected PCCH (i.e., the detected DCI, the detected DCI format) may be used for scheduling of a corresponding PSCH (e.g., PUSCH). Also, the UE 602 may generate, based on the physical cell identity, each of the sequence-shift patterns for the one or more UL RS(s) if the specific DCI format is detected. Namely, the UE 602 may generate, based on the physical cell identity, each of the sequence-shift patterns for the one or more UL RS(s) if the predetermined DCI format is detected.

Also, the sequence-shift pattern $f_{ss}^{PUSCH}$ may be given by $f_{ss}^{PUSCH}=n_{ID}^{RS}\mod 30$ with $n_{ID}^{RS}$ defined as above. Namely, $n_{ID}^{RS}$ may be defined by $n_{ID}^{RS}=z$. Here, the same single parameter z may be used for determining each of the sequence-shift patterns for the one or more UL RS(s) transmitted per UL antenna port. Namely, the UE 602 may determine, based on the parameter z, each of the sequence-shift patterns for the one or more UL RS(s) transmitted on an UL antenna port. The UE 602 may determine, based on the parameter z, each of the sequence-shift patterns for the one or more UL RS(s) if a value of the third information (i.e., a value of the parameter z) is configured. Also, the UE 602 may determine, based on the parameter z, each of the sequence-shift patterns for the one or more UL RS(s) unless the uplink transmission corresponds to a Random Access Response Grant or a retransmission of the same transport block as part of the contention based random access procedure.

Also, the UE 602 may generate, based on the parameter z, each of the sequence-shift patterns for the one or more UL RS(s) if the PCCH (e.g., the PDCCH) is detected in the CSS and/or the USS. In this case, the detected PCCH (i.e., the detected DCI, the detected DCI format) may be used for scheduling of a corresponding PSCH (e.g., PUSCH). Also, the UE 602 may generate, based on the parameter z, each of the sequence-shift patterns for the one or more UL RS(s) if the specific DCI format and/or DCI format other than the specific DCI format is detected. Namely, the UE 602 may generate, based on the parameter z, based on each of the sequence-shift patterns for the one or more UL RS(s) if the predetermined DCI format and/or DCI format other than the predetermined DCI format is detected.

Also, $n_{ID}^{RS}$ may be defined by $n_{ID}^{RS}=k$. Here, each of one or more parameters k may be used for determining each of the sequence-shift patterns for the one or more corresponding UL RS(s) transmitted on an UL antenna port. For example, a parameter k1 may be used for determining the sequence-shift patters for an UL RS1. Also, a parameter k2 may be used for determining the sequence-shift pattern for an UL RS2. Also, a parameter k3 may be used for determining the sequence-shift pattern for an UL RS3. Namely, the UE 602 may determine, based on each of one or more parameters k, each of the sequence-shift patterns for one or more corresponding UL RS(s) if a value of the fourth information (i.e., a value of the parameter k) is configured. Also, the UE 602 may determine, based on each of one or more parameters k, each of the sequence-shift patterns for one or more corresponding UL RS(s) transmitted unless the uplink transmission corresponds to a Random Access Response Grant or a retransmission of the same transport block as part of the contention based random access procedure.

Also, the UE 602 may generate, based on each of one or more parameters k, each of the sequence-shift patterns for the one or more UL RS(s) if the PCCH (e.g., the PDCCH) is detected in the USS. In this case, the detected PCCH (i.e., the detected DCI, the detected DCI format) may be used for scheduling of a corresponding PSCH (e.g., PUSCH). Also, the UE 602 may generate, based on each of one or more parameters k, each of the sequence-shift patterns for the one or more UL RS(s) if DCI format other than the specific DCI format is detected. Namely, the UE 602 may generate, based on each of one or more parameters k, each of the sequence-shift patterns for the one or more UL RS(s) if DCI format other than the predetermined DCI format is detected.

Also, the base sequence number v within the base sequence group in slot $n_s$ is defined by $$v = \begin{cases} c(n_s) & \text{if group hopping is disabled and sequence hopping is enabled} \\ 0 & \text{otherwise} \end{cases}$$

where the pseudo-random sequence c(i) is given by same sequence as described herein. The parameter Sequence-hopping-enabled provided by higher layers determines if sequence hopping is enabled or not.

Here, the parameter Sequence-hopping-enabled is a cell-specific, a UE-specific, and/or a beam-specific. Namely, for, example, the gNB 660 may configure the parameter Sequence-hopping-enabled included in the common RRC signal, and/or the dedicated RRC signal. Namely, the Sequence hopping can be enabled or disabled, by means of a single parameter Sequence-hopping-enabled, for one or more UL RSs transmitted on an UL antenna port. Also, the Sequence hopping can be enabled or disabled, by means of each of one or more parameters Sequence-hopping-enabled, for each of one or more corresponding UL RSs transmitted on an UL antenna port.

Also, sequence hopping for uplink transmission (e.g., PUSCH) can be disabled for a certain UE 602 through the higher-layer parameter Disable-sequence-group-hopping despite being enabled on a cell basis unless the PUSCH transmission corresponds to a Random Access Response Grant or a retransmission of the same transport block as part of the contention based random access procedure. Namely, the Sequence hopping can be disabled, by means of a single parameter Disable-sequence-group-hopping, for one or more UL RSs transmitted on an UL antenna port. Also, the Sequence hopping can be disabled, by means of each of one or more parameters Disable-sequence-group-hopping, for each of one or more corresponding UL RSs transmitted on an UL antenna port.

Here, the pseudo-random sequence generator shall be initialized with $$c_{init} = \left\lfloor \frac{N_{ID}^{cell}}{30} \right\rfloor \cdot 2^5 + f_{ss}^{PUSCH}$$

at the beginning of each radio frame. Namely, the physical cell identity may be used as a parameter associated with the base sequence number of the second sequence of UL RS(s). Here, the same single physical cell identity may be used for determining each of the base sequence numbers for the one or more UL RS(s) transmitted on an UL antenna port. Namely, the UE 602 may determine, based on the physical cell identity, each of the base sequence numbers for the one or more UL RS(s) transmitted per UL antenna port. The UE 602 may determine, based on the physical cell identity, each of the base sequence numbers for the one or more UL RS(s) if no value for third information and/or fourth information are configured by higher layers. Also, the UE 602 may determine, based on the physical cell identity, each of the base sequence numbers for the one or more UL RS(s) if the uplink transmission corresponds to a Random Access Response Grant or a retransmission of the same transport block as part of the contention based random access procedure.

Also, the UE 602 may generate, based on the physical cell identity, each of the base sequence numbers for the one or more UL RS(s) if the PCCH (e.g., the PDCCH) is detected in the CSS. In this case, the detected PCCH (i.e., the detected DCI, the detected DCI format) may be used for scheduling of a corresponding PSCH (e.g., PUSCH). Also, the UE 602 may generate, based on the physical cell identity, each of the base sequence numbers for the one or more UL RS(s) if the specific DCI format is detected. Namely, the UE 602 may generate, based on the physical cell identity, each of the base sequence numbers for the one or more UL RS(s) if the predetermined DCI format is detected.

Also, the pseudo-random sequence generator shall be initialized with $$c_{init} = \left\lfloor \frac{N_{ID}^{RS}}{30} \right\rfloor \cdot 2^5 + f_{ss}^{PUSCH}$$

at the beginning of each radio frame where $n_{ID}^{RS}$ defined as above. Namely, $n_{ID}^{RS}$ may be defined by $n_{ID}^{RS}=z$. Here, the same single parameter z may be used for determining each of the base sequence numbers for the one or more UL RS(s) transmitted on an UL antenna port. Namely, the UE 602 may determine, based on the parameter z, each of the base sequence numbers for the one or more UL RS(s) transmitted on an UL antenna port. The UE 602 may determine, based on the parameter z, each of the base sequence numbers for the one or more UL RS(s) if a value of the third information (i.e., a value of the parameter z) is configured. Also, the UE 602 may determine, based on the parameter z, each of the base sequence numbers for the one or more UL RS(s) unless the uplink transmission corresponds to a Random Access Response Grant or a retransmission of the same transport block as part of the contention based random access procedure.

Also, the UE 602 may generate, based on the parameter z, each of the base sequence numbers for the one or more UL RS(s) if the PCCH (e.g., the PDCCH) is detected in the CSS and/or the USS. In this case, the detected PCCH (i.e., the detected DCI, the detected DCI format) may be used for scheduling of a corresponding PSCH (e.g., PUSCH). Also, the UE 602 may generate, based on the parameter z, each of the base sequence numbers for the one or more UL RS(s) if the specific DCI format and/or DCI format other than the specific DCI format is detected. Namely, the UE 602 may generate, based on the parameter z, based on each of the base sequence numbers for the one or more UL RS(s) if the predetermined DCI format and/or DCI format other than the predetermined DCI is detected.

Also, $n_{ID}^{RS}$ may be defined by $n_{ID}^{RS}=k$. Here, each of one or more parameters k may be used for determining each of the base sequence numbers for the one or more corresponding UL RS(s) transmitted on an UL antenna port. For example, a parameter k1 may be used for determining the base sequence number for an UL RS1. Also, a parameter k2 may be used for determining the base sequence number for an UL RS2. Also, a parameter k3 may be used for determining the base sequence number for an UL RS3. Namely, the UE 602 may determine, based on each of one or more parameters k, each of the base sequence numbers for one or more corresponding UL RS(s) if a value of the fourth information (i.e., a value of the parameter k) is configured. Also, the UE 602 may determine, based on each of one or more parameters k, each of the base sequence numbers for one or more corresponding UL RSs unless the uplink transmission corresponds to a Random Access Response Grant or a retransmission of the same transport block as part of the contention based random access procedure.

Also, the UE 602 may generate, based on each of one or more parameters k, each of the base sequence numbers for the one or more UL RS(s) if the PCCH (e.g., the PDCCH) is detected in the USS. In this case, the detected PCCH (i.e., the detected DCI, the detected DCI format) may be used for scheduling of a corresponding PSCH (e.g., PUSCH). Also, the UE 602 may generate, based on each of one or more parameters k, each of the base sequence numbers for the one or more UL RS(s) if DCI format other than the specific DCI format is detected. Namely, the UE 602 may generate, based on each of one or more parameters k, each of the base sequence numbers for the one or more UL RS(s) if DCI format other than the predetermined DCI format is detected.

Figure 7:
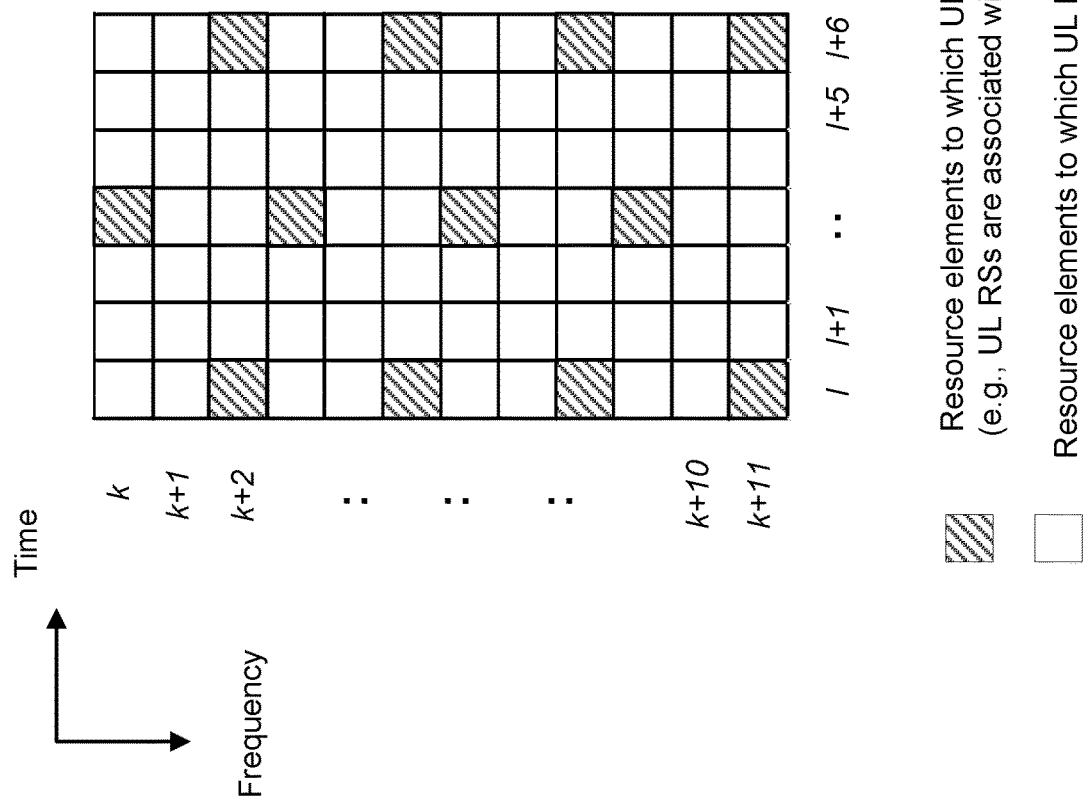
FIG. 7 illustrates an example where one or more UL reference signals (RSs) transmitted on a UL antenna port are mapped to the same resource elements.
Figure 8:
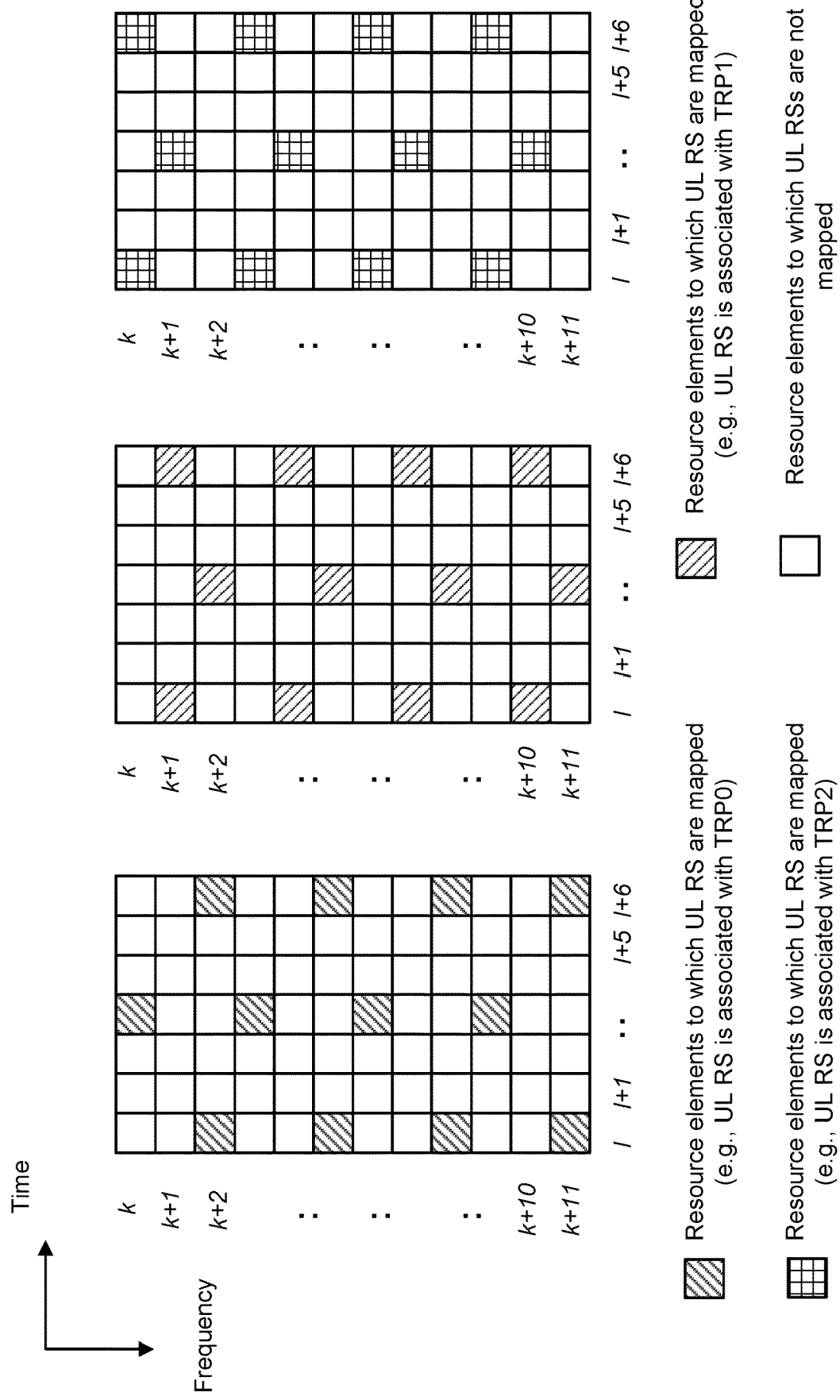
FIG. 8 illustrates an example where one or more UL RS(s) transmitted on a UL antenna port are mapped to different resource elements.

As described above, the UE 602 may transmit the one or more UL RSs associated with one or more TRPs on an UL antenna port. Here, resource elements to which one or more UL RSs transmitted on an UL antenna port are mapped may be determined. FIG. 7 and FIG. 8 show other examples of uplink transmissions.

For example, resource element(s) to which one or more UL RS(s) transmitted on an UL antenna port are mapped may be determined based on at least one of the following criteria. In mapping to resource elements, the positions of UL RS(s) are given by at least the frequency shift of UL RS(s). The frequency shift may be given by a physical cell identity is used unless a value of the frequency shift are provided, in which case the value of the frequency shift provided is used for the resource element(s) mapping.

For example, a sequence of UL RS(s) $r_{l,n_s}(m)$ may be mapped to complex-valued modulation symbols $a_{k,l}^{(p)}$ according to:

$$a_{k,l}^{(p)} = r_{l,n_s}(m') \text{ where}$$

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

-continued $$m = 0, 1, \ldots, 2 \cdot N_{RB}^{DL} - 1$$

$$m' = m + N_{RB}^{max,DL} - N_{RB}^{DL}$$

The variables v and $v_{shift}$ define the position in the frequency domain for the different reference signals where v is given by $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}.$$

The mapping shall be in increasing order of the frequency-domain index $n_{PRB}$ of the physical resource blocks assigned for the corresponding uplink transmission. The quantity $N_{RB}^{PDSCH}$ denotes the assigned bandwidth in resource blocks of the corresponding uplink transmission. Here, a cell-specific frequency shift may be given by $v_{shift} = N_{ID}^{cell} \bmod 3$.

Tables 1-3 show other examples of uplink transmissions. Table 1 illustrates one or more transmission modes that may be configured by the gNB 660 for PCCH and PSCH.

TABLE 1

| Transmission Mode | DCI Format | Search Space | Transmission scheme of Uplink Physical Channel corresponding to Downlink Physical Channel |
|---|---|---|---|
| Mode 1 | DCI Format X | Common and UE Specific | First transmission scheme (e.g., Single-beam transmission, and/or single-antenna port), port 0 |
| Mode 2 | DCI Format X | Common and UE Specific | First transmission scheme (e.g., Single-beam transmission, and/or single-antenna port), port 0 |
|  | DCI Format Y | UE Specific | Second transmission scheme (e.g., Multi-beam transmission, and/or single-antenna port), port 1 |
| Mode 3 | DCI Format X | Common and UE Specific | First transmission scheme (e.g., Single-beam transmission, and/or single-antenna port), port 0 |
|  | DCI Format Z | UE Specific | Third transmission scheme (e.g., Multi-beam transmission, and/or Multi-antenna port), port 2 or 3 |

Here, DCI format(s) that is monitored by the UE 602 may be limited based on the transmission mode configured. Namely, the UE 602 attempts to decode limited DCI format(s) based on the transmission mode configured. In Table 1, as one example, DCI format X is monitored by the UE 602 in a case that the UE 602 is configured with the transmission mode 1. And, DCI format X and DCI format Y are monitored by the UE 602 in a case that the UE 602 is configured with the transmission mode 2. And, DCI format X and DCI format Z are monitored by the UE 602 in a case that the UE 602 is configured with the transmission mode 3. Also, search space of downlink physical channel in which DCI format(s) is monitored by the UE 602 may be limited based on the DCI format(s). For example, DCI format X may be monitored in a common search space and a UE-specific search space. And, DCI format Y and DCI format Z may be monitored in a UE-specific search space only.

For example, in a case that the UE 602 is configured with the transmission mode 1, the UE 602 may perform, based on a detection of the DCI format X, uplink transmission using the first transmission scheme on the UL antenna port 0. Also, in a case that the UE 602 is configured with the transmission mode 2, the UE 602 may perform, based on a detection of the DCI format Y, uplink transmission using the second transmission scheme on the UL antenna port 1. Also, in a case that the UE 602 is configured with the transmission mode 3, the UE 602 may perform, based on a detection of the DCI format Z, uplink transmission using the third transmission scheme on the UL antenna port 2 or the UL antenna port 3.

Here, DCI associated with a beam index may be included in the DCI format Y. For example, as shown by Table 2, 2 bits information field may be included in the DCI format Y.

TABLE 2

| 2 Bits Information Field | |
|---|---|
| Value | Message |
| 00 | Reserved |
| 01 | Beam Index 1 |
| 10 | Beam Index 2 |
| 11 | Beam Index 3 |

The UE 602 may select a beam index used for uplink transmission based on a value of 2 bits information field included in the DCI format Y. For example, the UE 602 performs uplink transmission on a beam with a first beam index (e.g., a beam index 1) using an UL antenna port 1 in a case that a value of 2 bits information field is set to "01". In this case, the UE 602 may perform uplink transmission with an UL RS (e.g., an UL RS1) using the UL antenna port 1.

Also, as shown by Table 3, DCI associated with a beam index and/or an UL antenna port may be included in the DCI format Z. Table 3 illustrates a 3 bits information field that may be included in the DCI format Z.

TABLE 3

| 3 Bits Information Field | |
|---|---|
| Value | Message |
| 000 | Reserved |
| 001 | Beam Index 1, port 2 |
| 010 | Beam Index 2, port 2 |
| 011 | Beam Index 3, port 2 |
| 100 | Beam Index 1, port 3 |
| 101 | Beam Index 2, port 3 |
| 110 | Beam Index 3, port 3 |
| 111 | Reserved |

According to Table 3, the UE 602 may select a beam and/or an UL antenna port used for uplink transmission based on a value of 3 bits information field included in the DCI format Z. For example, the UE 602 performs uplink transmission on a beam with a second beam index (e.g., a beam index 3) on an UL antenna port 2 in a case that a value of 3 bits information field is set to "011". In this case, the UE 602 may perform uplink transmission with an UL RS (e.g., an UL RS3) using the UL antenna port 2.

As described herein, in the uplink transmission, the UE 602 may transmit one or more UL RSs on an UL antenna port (i.e., the same UL antenna port, the UL antenna port with the same number, or the UL antenna port with the same index). For example, the UE 602 may transmit three UL RSs on the same single UL antenna port.

Here, one or more UL RS(s) (e.g., three UL RSs) may be defined by the same single first sequence. As described herein, the same first sequence for one or more UL RSs may be generated based on the physical cell identity. Also, as described herein, the same first sequence for one or more UL RSs may be generated based on the parameter x. Also, one or more UL RSs may be defined by the same single second sequence. As described herein, the same second sequence for one or more UL RSs may be generated based on the physical cell identity. Also, as described herein, the same second sequence for one or more UL RSs may be generated based on the parameter z.

Also, one or more UL RSs may be defined by each of different first sequences. As described herein, each of the different first sequences for one or more UL RS(s) may be generated based on the parameter y. Also, one or more UL RSs may be defined by each of different second sequences. As described herein, each of the different second sequences for one or more UL RS(s) may be generated based on the parameter k.

Also, one or more UL RSs may be mapped to the same positions of the resource elements. As described herein, the same resource element(s) to which one or more UL RS(s) are mapped may be determined based on the physical cell identity. Also, as described herein, the same resource element(s) to which one or more UL RS(s) are mapped may be determined based on the parameter p.

Also, one or more UL RS(s) may be mapped to different positions of resource elements. As described herein, resource elements to which each of one or more UL RSs are mapped may be determined based on the parameter q.

Here, although the described beam indices may be used to identify beams, implementations are not limited to such instances. The beam indices may indicate antenna ports that are used for the corresponding uplink channel(s) and/or signal(s). For example, the beam indices may indicate antenna ports which are used for the corresponding PSCH (e.g., PUSCH, the corresponding to transmission of PUSCH).

Also, during initial access procedure or upon the request from the gNB 660, the UE 602 may perform multiple PRACH transmissions. Each of the beam indices (e.g. index 0, 1, 2, . . . ) may correspond to an antenna port which is used for each of the PRACH transmissions (e.g. PRACH 0, 1, 2, . . . ), where PRACH 0, 1, 2, . . . may be distinguished by preambles and/or time/frequency domain PRACH resources.

For another example, the UE 602 may perform multiple sounding reference signal (SRS) transmissions. Each of the beam indices (e.g. index 0, 1, 2, . . . ) may correspond to an antenna port which is used for each of the SRS transmissions (e.g. SRS 0, 1, 2, . . . ), where SRS 0, 1, 2, . . . may be distinguished by SRS configuration indices and/or time/frequency domain resources for SRS transmissions.

For yet another example, each of the beam indices (e.g. index 0, 1, 2, . . . ) may correspond to an antenna port which is used for each of the PRACH and SRS transmissions (e.g. PRACH 0, 1, 2, . . . , SRS 0, 1, 2, . . . ).

Alternatively, the beam indices may indicate quasi-co-location (and/or quasi-co-beam/direction) assumptions of antenna ports which are used for the corresponding uplink channel(s) and/or signal(s). For example, the beam indices may indicate quasi-co-location (and/or quasi-co-beam/direction) assumptions of antenna ports which are used for the corresponding PSCH (e.g., PUSCH, the corresponding to transmission of PUSCH).

Also, each of the beam indices (e.g. index 0, 1, 2, . . . ) may indicate use of an antenna port which has quasi-co-location (and/or quasi-co-beam/direction) with the antenna port used for each of the PRACH transmissions (e.g. PRACH 0, 1, 2, . . . ). For another example, each of the beam indices (e.g. index 0, 1, 2, . . . ) may indicate use of an antenna port which has quasi-co-location (and/or quasi-co-beam/direction) with the antenna port used for each of the SRS transmissions (e.g. SRS 0, 1, 2, . . . ). For yet another example, each of the beam indices (e.g. index 0, 1, 2, . . . ) may indicate use of an antenna port which has quasi-co-location (and/or quasi-co-beam/direction) with the antenna port used for each of the PRACH and SRS transmissions (e.g. PRACH 0, 1, 2, . . . , SRS 0, 1, 2, . . . ).

Herein, two antenna ports are said to be quasi co-located (and/or quasi-co-beamed/directed) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and/or average delay. The quasi-co-locations (and/or quasi-co-beam/direction) indicated by the beam indices may mean quasi-co-locations at the gNB 660 side that the UE 602 predicts with respect to delay spread, Doppler spread, Doppler shift, and/or average delay.

In this disclosure, all possible combinations of the descriptions herein are not precluded. For example, all possible combinations of the first sequence generation, the second sequence generation, and/or the resource element(s) mapping are not precluded.

FIG. 7 illustrates an example where one or more UL RSs transmitted on a UL antenna port are mapped to the same resource elements. Namely, one or more UL RSs associated with one or more TRPs (e.g., TRP0, TRP1, and TRP2) are mapped to the same position of the resource elements.

As shown by FIG. 7, the one or more UL RSs transmitted on an UL antenna port may be mapped to the same positions of the resource elements. For example, the same single physical cell identity may be used for determining the positions of the resource elements to which the one or more UL RSs are mapped. Namely, the UE 602 may determine, based on the physical cell identity, the positions of the resource element(s) to which the one or more UL RSs are mapped. The UE 602 may determine, based on the physical cell identity, the positions of the resource elements to which the one or more UL RSs are mapped if no value of fifth information and/or sixth information are configured by higher layers. The UE 602 may determine, based on physical cell identity, the positions of the resource elements to which the one or more UL RS(s) are mapped if the uplink transmission corresponds to a Random Access Response Grant or a retransmission of the same transport block as part of the contention based random access procedure.

Also, the UE 602 may determine, based on the physical cell identity, the positions of the resource elements to which the one or more UL RS(s) are mapped if the PCCH (e.g., the PDCCH) is detected in the CSS. In this case, the detected PCCH (i.e., the detected DCI, the detected DCI format) may be used for scheduling of a corresponding PSCH (e.g., PUSCH). Also, the UE 602 may determine, based on the physical cell identity, the positions of the resource elements to which the one or more UL RS(s) are mapped if the specific DCI format is detected. Namely, the UE 602 may determine, based on the physical cell identity, the positions of the resource elements to which the one or more UL RS(s) are mapped if the predetermined DCI format is detected.

Here, resource element(s) to which PSCH(s) (e.g., PUSCH(s)) is mapped is determined based on at least the positions of the resource element(s) to which the one or more UL RSs are mapped. For example, the PSCH(s) is not mapped to resource element(s) to which the one or more UL RSs are mapped. Namely, for example, the physical cell identity may be used for determining the positions of the resource elements to which the PSCH(s) is mapped. Namely, the UE 602 may determine, based on the physical cell identity, the positions of the resource element(s) to which the PSCH(s) is mapped. The UE 602 may determine, based on the physical cell identity, the positions of the resource elements to which the PSCH(s) is mapped if no value of fifth information and/or sixth information are configured by higher layers. The UE 602 may determine, based on physical cell identity, the positions of the resource elements to which the PSCH(s) is mapped if the uplink transmission corresponds to a Random Access Response Grant or a retransmission of the same transport block as part of the contention based random access procedure.

Also, the UE 602 may determine, based on the physical cell identity, the positions of the resource elements to which the PSCH(s) is mapped if the PCCH (e.g., the PDCCH) is detected in the CSS. In this case, the detected PCCH (i.e., the detected DCI, the detected DCI format) may be used for scheduling of a corresponding PSCH (e.g., PUSCH). Also, the UE 602 may determine, based on the physical cell identity, the positions of the resource elements to which the PSCH(s) is mapped if the specific DCI format is detected. Namely, the UE 602 may determine, based on the physical cell identity, the positions of the resource elements to which the PSCH(s) is mapped if the predetermined DCI format is detected.

Also, as another example, a UE-specific frequency shift may be given by $v_{shift} = p \bmod 3$. Namely, the parameter p may be provided as a parameter associated with UL RS(s) resource elements mapping. Here, the parameter p may directly indicate a value of the frequency shift.

Here, the parameter p may be configured by higher layers. For, example, the gNB 660 may configure the parameter p by using the fifth information included in the RRC message. Also, the parameter p may be indicated by DCI. And, the parameter p may be a UE-specific. Here, the same single parameter p may be used for determining the positions of the resource elements to which the one or more UL RSs are mapped. Namely, the UE 602 may generate, based on the parameter p, the positions of the resource elements to which the one or more UL RS(s) are mapped. The UE 602 may determine, based on the parameter p, the positions of the resource elements to which the one or more UL RS(s) are mapped if a value of the fifth information (i.e., a value of the parameter p) is configured. The UE 602 may determine, based on the parameter p, the positions of the resource elements to which the one or more UL RS(s) are mapped unless the uplink transmission corresponds to a Random Access Response Grant or a retransmission of the same transport block as part of the contention based random access procedure.

Also, the UE 602 may determine, based on the parameter p, the positions of the resource elements to which the one or more UL RS(s) are mapped if the PCCH (e.g., the PDCCH) is detected in the CSS and/or the USS. In this case, the detected PCCH (i.e., the detected DCI, the detected DCI format) may be used for scheduling of a corresponding PSCH (e.g., PUSCH). Also, the UE 602 may determine, based on the parameter p, the positions of the resource elements to which the one or more UL RS(s) are mapped if the specific DCI format and/or DCI format other than the specific DCI format is detected. Namely, the UE 602 may determine, based on the parameter p, the positions of the resource elements to which the one or more UL RS(s) are mapped if the predetermined DCI format and/or DCI format other than the predetermined DCI format is detected.

Namely, the parameter p may be used for determining the positions of the resource elements to which the PSCH(s) is mapped. Namely, the UE 602 may determine, based on the parameter p, the positions of the resource element(s) to which the PSCH(s) is mapped. The UE 602 may determine, based on the parameter p, the positions of the resource elements to which the PSCH(s) is mapped if a value of fifth information (i.e. a value of the parameter p) are configured by higher layers. The UE 602 may determine, based on the parameter p, the positions of the resource elements to the PSCH(s) are mapped unless the uplink transmission corresponds to a Random Access Response Grant or a retransmission of the same transport block as part of the contention based random access procedure.

Also, the UE 602 may determine, based on the parameter p, the positions of the resource elements to the PSCH(s) are mapped if the PCCH (e.g., the PDCCH) is detected in the CSS and/or the USS. In this case, the detected PCCH (i.e., the detected DCI, the detected DCI format) may be used for scheduling of a corresponding PSCH (e.g., PUSCH). Also, the UE 602 may determine, based on the parameter p, the positions of the resource elements to the PSCH(s) are mapped if the specific DCI format and/or DCI format other than the specific DCI format is detected. Namely, the UE 602 may determine, based on the parameter p, the positions of the resource elements to the PSCH(s) are mapped if the predetermined DCI format and/or DCI format other than the predetermined DCI format is detected.

FIG. 8 illustrates an example where one or more UL RS(s) transmitted on a UL antenna port are mapped to different resource elements. Namely, each of one or more UL RSs associated with one or more TRPs are mapped to different positions of the resource elements.

Also, as shown by FIG. 8, the one or more UL RSs transmitted on an UL antenna port may be mapped to different resource element(s). For example, a UE-specific frequency shift and/or a beam-specific frequency shift may be given by $v_{shift}$=q mod 3. Namely, the parameter q may be provided as a parameter associated with UL RS(s) resource elements mapping. Here, the parameter q may directly indicate a value of the frequency shift.

Here, the one or more parameters q may be configured by higher layers. For, example, the gNB 660 may configure the one or more parameters q by using the sixth information included in the RRC message. Also, the one or more parameters q may be indicated by DCI. And, the parameter q may be a UE-specific and/or a beam-specific. For example, the gNB 660 may configure more than one parameters q (e.g. up to four parameters q) by using the second information, and the UE 602 use one parameter q among more than one parameters q based on the DCI (or the higher layer parameter). As mentioned later, the gNB 660 may transmit the DCI used for indicating that which beam index is used for uplink transmission. Namely, DCI used for indicating one parameter q may be included in DCI format mentioned later (e.g., DCI format Y and/or DCI format Z). Also, the higher layer parameter may be included in the RRC message.

Here, each of one or more parameters q may be used for determining each of the positions of the resource elements to which the corresponding one or more UL RS(s) are mapped. For example, a parameter q1 may be used for determining the positions of the resource element(s) to which UL RS1 is mapped. Also, a parameter q2 may be used for determining the positions of the resource element(s) to which UL RS2 is mapped. Also, a parameter q3 may be used for determining the positions of the resource element(s) to which UL RS3 is mapped. Namely, the UE 602 may determine, based on each of one or more parameters q, each of the positions of the resource elements to which the one or more corresponding UL RS(s) are mapped if a value of the sixth information (i.e., a value of the parameter q) is configured. Also, the UE 602 may determine, based on each of one or more parameters q, each of the positions of the resource elements to which the one or more corresponding UL RS(s) are mapped unless the uplink transmission corresponds to a Random Access Response Grant or a retransmission of the same transport block as part of the contention based random access procedure.

Also, the UE 602 may determine, based on each of one or more parameters q, each of the positions of the resource elements to which the one or more UL RS(s) are mapped if the PCCH (e.g., the PDCCH) is detected in the USS. In this case, the detected PCCH (i.e., the detected DCI, the detected DCI format) may be used for scheduling of a corresponding PSCH (e.g., PUSCH). Also, the UE 602 may determine, based on each of one or more parameters q, each of the positions of the resource elements to which the one or more UL RS(s) are mapped if DCI format other than the specific DCI format is detected. Namely, the UE 602 may determine, based on each of one or more parameters q, each of the positions of the resource elements to which the one or more UL RS(s) are mapped if DCI format other than the predetermined DCI format is detected.

Namely, the one or more parameters q may be used for determining the positions of the resource elements to which the PSCH(s) is mapped. Namely, the UE 602 may determine, based on each of the one or more parameters q, each of the positions of the resource element(s) to which the PSCH(s) is mapped. The UE 602 may determine, based on each of the one or more parameters q, each of the positions of the resource elements to which the PSCH(s) is mapped if a value of fifth information (i.e. a value of the parameters q) are configured by higher layers. The UE 602 may determine, based on each of the one or more parameters q, each of the positions of the resource elements to the PSCH(s) are mapped unless the uplink transmission corresponds to a Random Access Response Grant or a retransmission of the same transport block as part of the contention based random access procedure.

Also, the UE 602 may determine, based on each of one or more parameters q, each of the positions of the resource elements to the PSCH(s) are mapped if the PCCH (e.g., the PDCCH) is detected in the USS. In this case, the detected PCCH (i.e., the detected DCI, the detected DCI format) may be used for scheduling of a corresponding PSCH (e.g., PUSCH). Also, the UE 602 may determine, based on each of one or more parameters q, each of the positions of the resource elements to the PSCH(s) are mapped if DCI format other than the specific DCI format is detected. Namely, the UE 602 may determine, based on each of one or more parameters q, each of the positions of the resource elements to the PSCH(s) are mapped if DCI format other than a predetermined DCI format is detected.

Here, a default value of the parameter x (i.e., a default value of the first information), a default value of the parameter y (i.e., a default value of the second information), a default value of the parameter z (i.e., a default value of the third information), a default value of the parameter k (i.e., a default value of the fourth information), a default value of the parameter p (i.e., a default value of the fifth information), and/or a default value of the parameter q (i.e., a default value of the sixth information) may be defined. For example, the default value of the parameter x may be zero. Also, for example, the default value of the parameter y may be zero. Also, for example, the default value of the parameter z may be zero. Also, for example, the default value of the parameter k may be zero. Also, for example, the default value of the parameter p may be zero. Also, for example, the default value of the parameter q may be zero.

Also, for example, a default value of the cyclic shift $\alpha_\lambda$, a default value of the group-hopping pattern $f_{gh}(n_s)$, a default value of the sequence-shift pattern $f_{ss}^{PUSCH}$, a default value of the base sequence number v, a default value of $v_{shift}$ may be defined. For example, the default value of the cyclic shift $\alpha_\lambda$ may be defined by the values of $n_{DMRS}^{(1)}$ that is set to zero and the physical cell identity. For example, the default value of the cyclic shift $\alpha_\lambda$ may be defined by the values of $n_{DMRS,\lambda}^{(2)}$ that is set to zero and the physical cell identity.

Also, for example, the default value of the group-hopping pattern $f_{gh}(n_s)$ may be defined by the value of the group-hopping pattern $f_{gh}(n_s)$ that is set to zero. Also, for example, the default value of the sequence-shift pattern $f_{ss}$ PUSCH may be defined by the value of the sequence-shift pattern $f_{ss}$ PUSCH that is set to zero.

Also, for example, the default value of the sequence-shift pattern $f_{ss}^{PUSCH}$ may be defined by the values of $\Delta_{ss}$ that is set to zero and the physical cell identity. Also, for example, the default value of the base sequence number v may be defined by the value of the base sequence number v that is set to zero. Also, for example, the default value of $v_{shift}$ may be defined by the value of $v_{shift}$ that is set to zero.

Here, the default value(s) of the parameter(s) (i.e., the default value of the parameter x, the default value of the parameter y, the default value of the parameter z, the parameter k, the default value of the parameter p, the default value of the parameter q, the default value of the cyclic shift $\alpha_\lambda$, the default value of the group-hopping pattern $f_{gh}(n_s)$, the default value of the sequence-shift pattern $f_{ss}^{PUSCH}$, the default value of the base sequence number v, and/or a default value of $v_{shift}$) may be specified, in advance, by specifications and known information between the gNB 660 and the UE 602.

Here, for example, the default value(s) of the parameter(s) may be used in a case that the uplink transmission corresponds to the Random Access Response Grant in the random access procedure. Also, the default value(s) of the parameter(s) may be used in a case that the uplink transmission corresponds the retransmission of the same transport block in the random access procedure. Also, the default value(s) of the parameter(s) may be used in a case that the PCCH (e.g., PDCCH) is detected in the CSS. Also, the default value(s) of the parameter(s) may be used in a case that the specific DCI format is detected. Namely, the default value(s) of the parameter(s) may be used in a case that the predetermined DCI format is detected. Also, the default value(s) of the parameter(s) may be used in a case that no value of the first information (i.e., no value of the parameter x) is configured. Also, the default value(s) of the parameter(s) may be used in a case that no value of the second information (i.e., no value of the parameter y) is configured. Also, the default value(s) of the parameter(s) may be used in a case that no value of the third information (i.e., no value of the parameter z) is configured. Also, the default value(s) of the parameter(s) may be used in a case that no value of the fourth information (i.e., no value of the parameter k) is configured. Also, the default value(s) of the parameter(s) may be used in a case that no value of the fifth information (i.e., no value of the parameter p) is configured. Also, the default value(s) of the parameter(s) may be used in a case that no value of the sixth information (i.e., no value of the parameter q) is configured. Also, the default value(s) of the parameter(s) may be used in a case that no value of the seventh information is configured. Also, the default value(s) of the parameter(s) may be used in a case that no value of the eighth information is configured.

Here, the gNB 660 may transmit ninth information associated with the 2 bits information field and/or the 3 bits information field as above mentioned. For example, the gNB 660 may transmit ninth information used for indicating whether the 2 bits information field is present or not in the DCI format (e.g., the DCI format Y). For example, the gNB 660 transmit ninth information used for indicating whether the 3 bits information field is present or not in the DCI format (e.g., the DCI format Z). And, for example, the default value(s) may be used in a case that the 2 bits information field is not present in the DCI format (i.e., the ninth information indicates that the 2 bits information field is not present in the DCI format). Also, the default value(s) may be used in a case that the 3 bits field is not present in the DCI format (i.e., the ninth information indicates that the 3 bits information field is not present in the DCI format). Namely, the default value(s) may be used in a case that parameter(s) associated with transmission(s) on beam(s) is not configured and/or indicated. Also, the default value(s) may be used in a case that parameter(s) associated with transmission(s) on TRP(s) is not configured and/or indicated.

Figure 9:
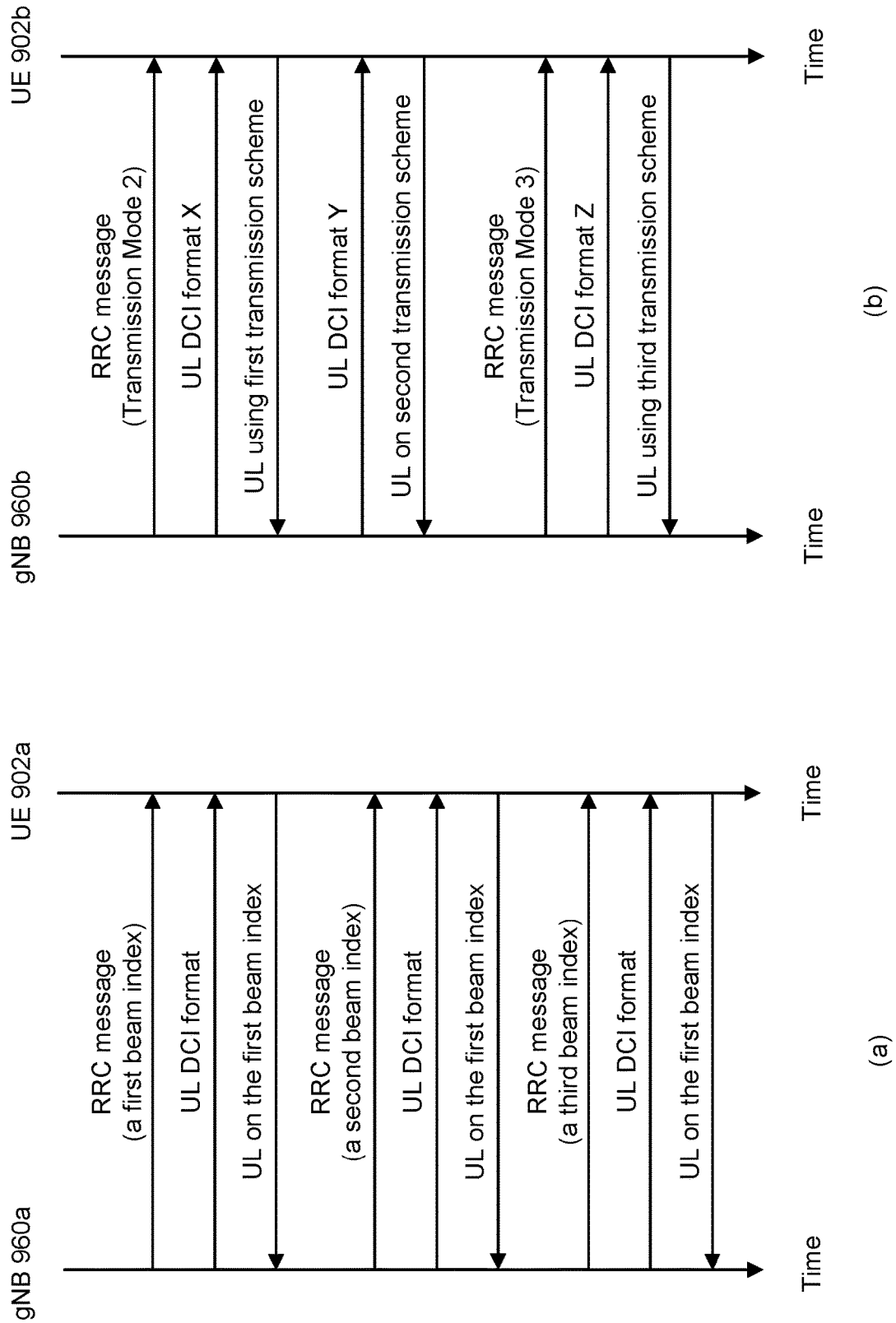
FIG. 9 shows another example of uplink transmissions.

FIG. 9 shows another example of uplink transmissions. For example, as shown by FIG. 9(a), the gNB 960*a* may transmit seventh information associated with one or more beam indices by using the RRC message. Namely, the seventh information may be used for configuring the one or more beam indices used for uplink transmissions. Here, the one or more beam indices may be associated with an UL antenna port and/or a DL antenna port. Also, the one or more beam indices may be associated with a pair of a DL beam index (may be a DL antenna port, i.e., D-beam) and an UL beam index (may be an UL antenna port, i.e., U-beam). Also, the one or more beam indices may be associated with pre-coding indices for downlink transmissions and/or uplink transmissions.

In FIG. 9(a), for example, the gNB 960*a* may configure a first beam index (e.g., a beam index 1) for uplink transmission. The uplink transmission on a beam with the first beam index (e.g., a beam index 1) may be performed using an UL antenna port (e.g., UL antenna port 0). In this case, the UE 902*a* may perform uplink transmission with an UL RS (e.g., an UL RS1) using the UL antenna port 0.

The gNB 960*a* may configure a second beam index (e.g., a beam index 3) for uplink transmission. And, the uplink transmission on a beam with the third beam index (e.g., a beam index 3) may be performed using an UL antenna port (e.g., the UL antenna port 0). In this case, the UE 902*a* may perform uplink transmission with an UL RS (e.g., an UL RS3) using the UL antenna port 0.

Furthermore, the gNB 960*a* may configure a third beam index (e.g., a beam index 2) for uplink transmission. The uplink transmission on a beam with the third beam index (e.g., a beam index 2) may be performed using an UL antenna port (e.g., the UL antenna port 0). In this case, the UE 902*a* may perform uplink transmission with an UL RS (e.g., an UL RS2) using the UL antenna port 0.

Also, for example, as shown by FIG. 9(b), the gNB 960b may transmit eighth information associated with uplink transmission mode by using the RRC message. For example, the gNB 960b may configure a transmission mode 1 associated with a first transmission scheme (e.g., single-beam transmission and/or single-antenna port). Here, uplink transmission using the first transmission scheme may be performed using an UL antenna port 0.

Also, for example, the gNB 960b may configure a transmission mode 2 associated with the first transmission scheme and a second transmission scheme (e.g., multi-beam transmission and/or single-antenna port). Here, uplink transmission using the second transmission scheme may be performed using an UL antenna port 1. Also, for example, the gNB 960b may configure a transmission mode 3 associated with the first transmission scheme and a third transmission scheme (e.g., multi-beam transmission and/or multi-antenna port). Here, uplink transmission using the third transmission scheme may be performed using an UL antenna port 2 or 3.

Figure 10:
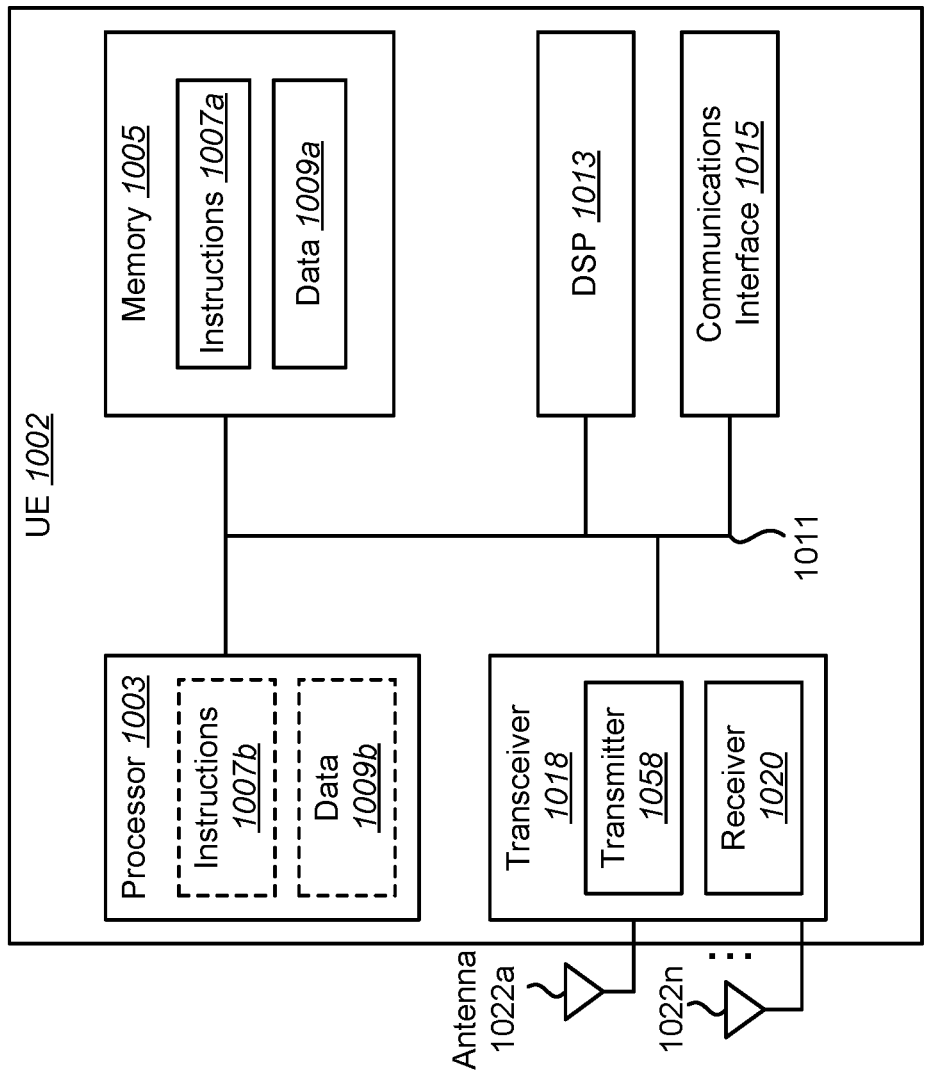
FIG. 10 illustrates various components that may be utilized in a UE.

FIG. 10 illustrates various components that may be utilized in a UE 1002. The UE 1002 described in connection with FIG. 10 may be implemented in accordance with the UE 102 described in connection with FIG. 1. The UE 1002 includes a processor 1003 that controls operation of the UE 1002. The processor 1003 may also be referred to as a central processing unit (CPU). Memory 1005, which may include read-only memory (ROM), random access memory (RAM), a combination of the two or any type of device that may store information, provides instructions 1007a and data 1009a to the processor 1003. A portion of the memory 1005 may also include non-volatile random access memory (NVRAM). Instructions 1007b and data 1009b may also reside in the processor 1003. Instructions 1007b and/or data 1009b loaded into the processor 1003 may also include instructions 1007a and/or data 1009a from memory 1005 that were loaded for execution or processing by the processor 1003. The instructions 1007b may be executed by the processor 1003 to implement the methods described above.

The UE 1002 may also include a housing that contains one or more transmitters 1058 and one or more receivers 1020 to allow transmission and reception of data. The transmitter(s) 1058 and receiver(s) 1020 may be combined into one or more transceivers 1018. One or more antennas 1022a-n are attached to the housing and electrically coupled to the transceiver 1018.

The various components of the UE 1002 are coupled together by a bus system 1011, which may include a power bus, a control signal bus and a status signal bus, in addition to a data bus. However, for the sake of clarity, the various buses are illustrated in FIG. 10 as the bus system 1011. The UE 1002 may also include a digital signal processor (DSP) 1013 for use in processing signals. The UE 1002 may also include a communications interface 1015 that provides user access to the functions of the UE 1002. The UE 1002 illustrated in FIG. 10 is a functional block diagram rather than a listing of specific components.

Figure 11:
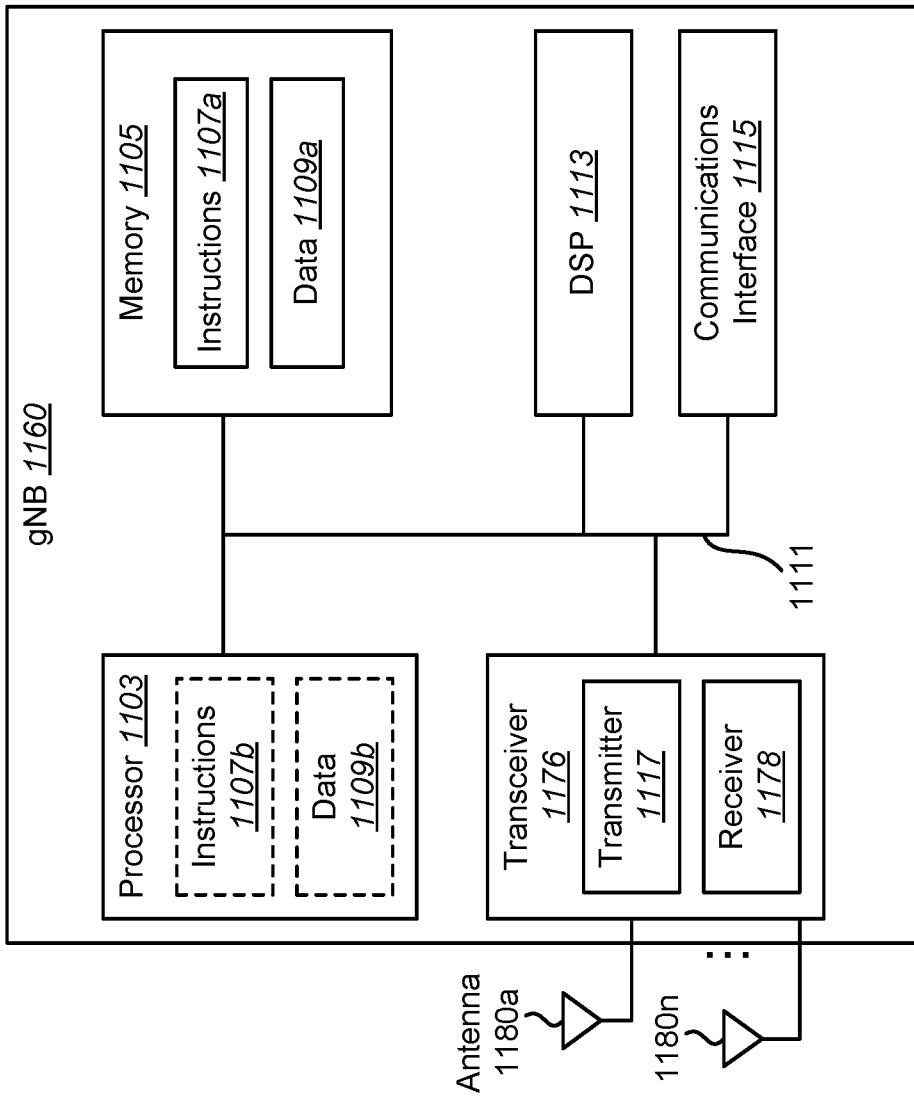
FIG. 11 illustrates various components that may be utilized in a gNB.

FIG. 11 illustrates various components that may be utilized in a gNB 1160. The gNB 1160 described in connection with FIG. 11 may be implemented in accordance with the gNB 160 described in connection with FIG. 1. The gNB 1160 includes a processor 1103 that controls operation of the gNB 1160. The processor 1103 may also be referred to as a central processing unit (CPU). Memory 1105, which may include read-only memory (ROM), random access memory (RAM), a combination of the two or any type of device that may store information, provides instructions 1107a and data 1109a to the processor 1103. A portion of the memory 1105 may also include non-volatile random access memory (NVRAM). Instructions 1107b and data 1109b may also reside in the processor 1103. Instructions 1107b and/or data 1109b loaded into the processor 1103 may also include instructions 1107a and/or data 1109a from memory 1105 that were loaded for execution or processing by the processor 1103. The instructions 1107b may be executed by the processor 1103 to implement the methods described above.

The gNB 1160 may also include a housing that contains one or more transmitters 1117 and one or more receivers 1178 to allow transmission and reception of data. The transmitter(s) 1117 and receiver(s) 1178 may be combined into one or more transceivers 1176. One or more antennas 1180a-n are attached to the housing and electrically coupled to the transceiver 1176.

The various components of the gNB 1160 are coupled together by a bus system 1111, which may include a power bus, a control signal bus and a status signal bus, in addition to a data bus. However, for the sake of clarity, the various buses are illustrated in FIG. 11 as the bus system 1111. The gNB 1160 may also include a digital signal processor (DSP) 1113 for use in processing signals. The gNB 1160 may also include a communications interface 1115 that provides user access to the functions of the gNB 1160. The gNB 1160 illustrated in FIG. 11 is a functional block diagram rather than a listing of specific components.

Figure 12:
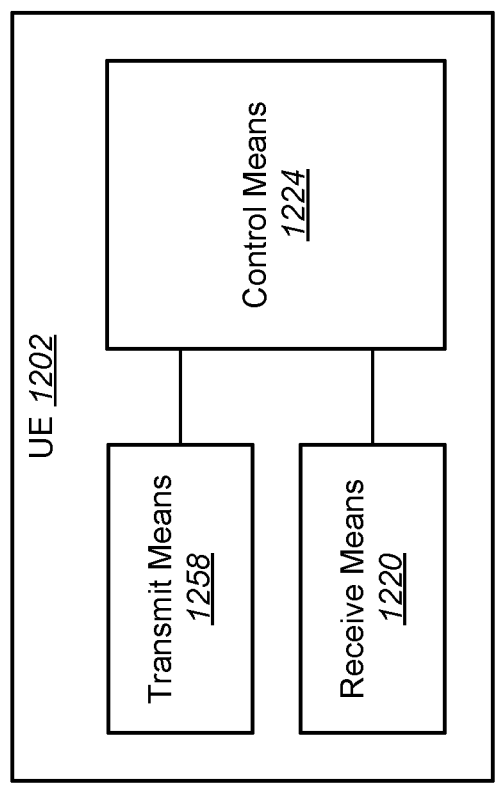
FIG. 12 is a block diagram illustrating one implementation of a UE in which systems and methods for performing uplink transmissions may be implemented.

FIG. 12 is a block diagram illustrating one implementation of a UE 1202 in which systems and methods for performing uplink transmissions may be implemented. The UE 1202 includes transmit means 1258, receive means 1220 and control means 1224. The transmit means 1258, receive means 1220 and control means 1224 may be configured to perform one or more of the functions described in connection with FIG. 1 above. FIG. 10 above illustrates one example of a concrete apparatus structure of FIG. 12. Other various structures may be implemented to realize one or more of the functions of FIG. 1. For example, a DSP may be realized by software.

Figure 13:
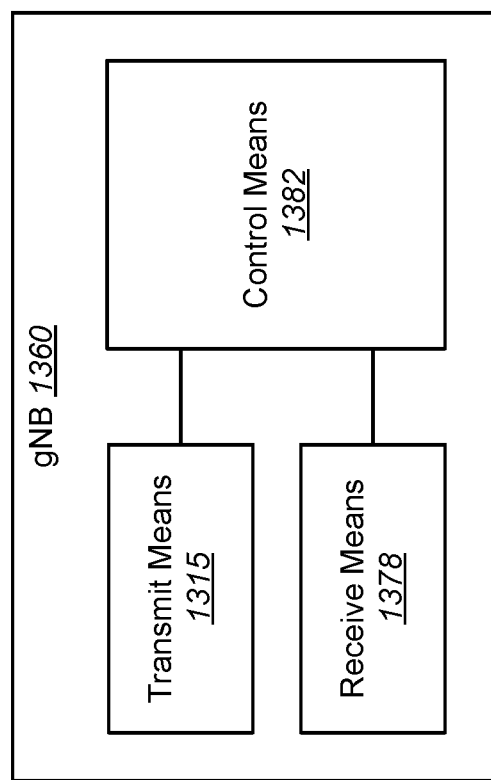
FIG. 13 is a block diagram illustrating one implementation of a gNB in which systems and methods for performing uplink transmissions may be implemented.

FIG. 13 is a block diagram illustrating one implementation of a gNB 1360 in which systems and methods for performing uplink transmissions may be implemented. The gNB 1360 includes transmit means 1317, receive means 1378 and control means 1382. The transmit means 1317, receive means 1378 and control means 1382 may be configured to perform one or more of the functions described in connection with FIG. 1 above. FIG. 11 above illustrates one example of a concrete apparatus structure of FIG. 13. Other various structures may be implemented to realize one or more of the functions of FIG. 1. For example, a DSP may be realized by software.

Figure 14:
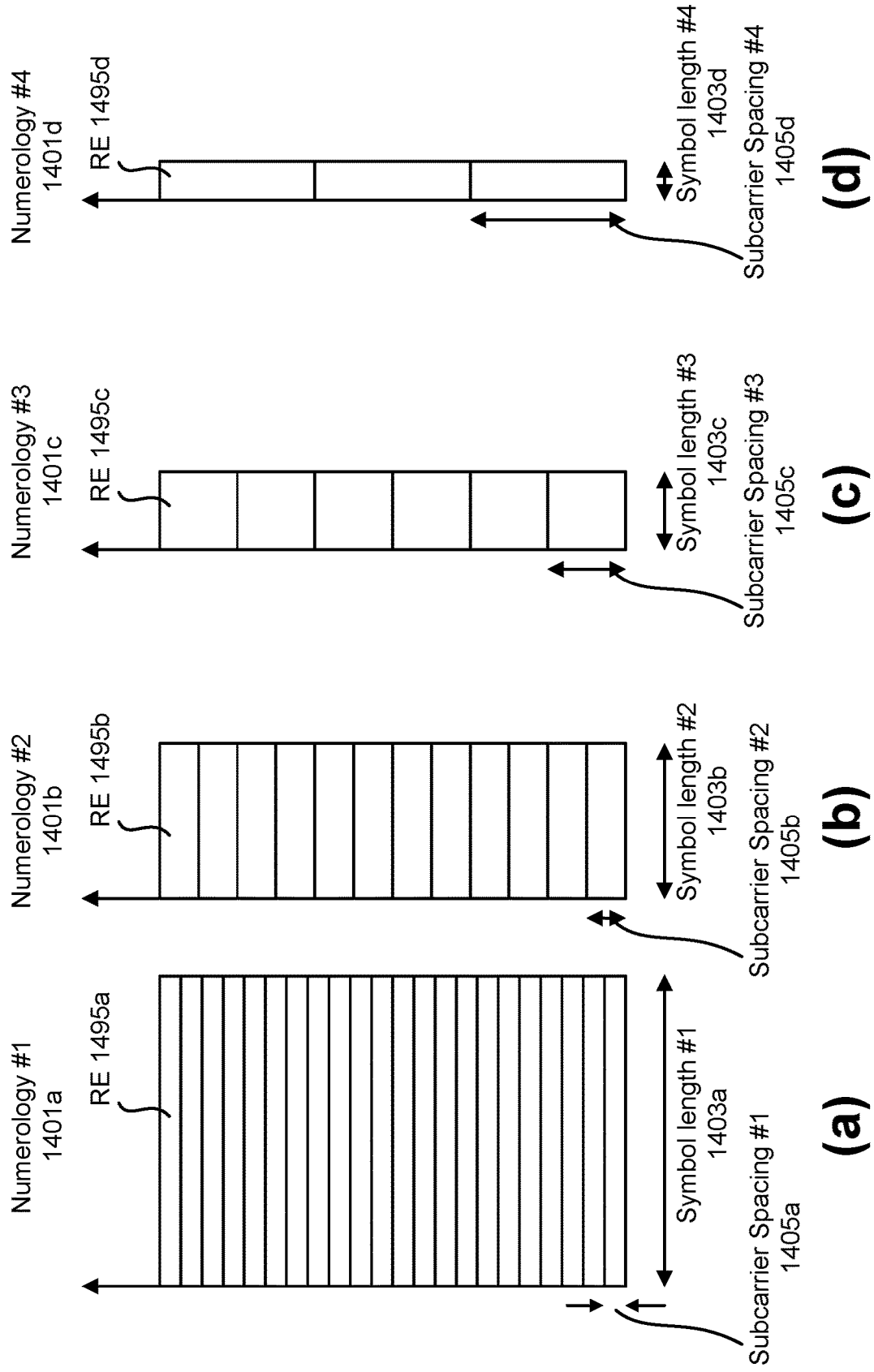
FIG. 14 shows examples of several numerologies.

FIG. 14 shows examples of several numerologies 1401. The numerology #1 1401a may be a basic numerology (e.g., a reference numerology). For example, a RE 1495a of the basic numerology 1401a may be defined with subcarrier spacing 1405a of 15 kHz in frequency domain and 2048 Ts+CP length (e.g., 160 Ts or 144 Ts) in time domain (i.e., symbol length #1 1403a), where Ts denotes a baseband sampling time unit defined as $1/(15000*2048)$ seconds. For the i-th numerology, the subcarrier spacing 1405 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 14 shows four numerologies, but the system may support another number of numerologies. Furthermore, the system does not have to support all of the 0-th to the I-th numerologies, i=0, 1, . . . , I.

Figure 15:
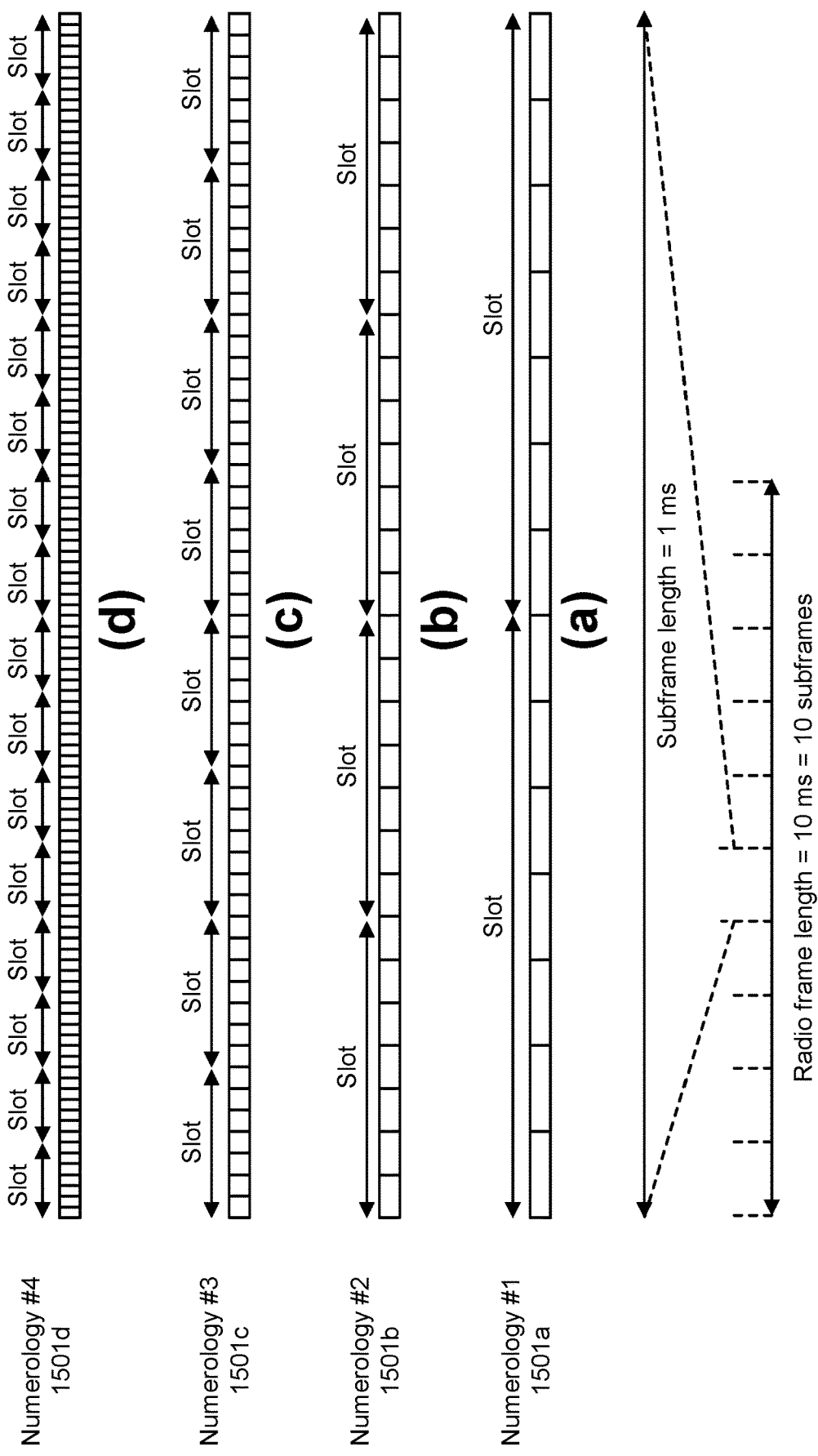
FIG. 15 shows examples of subframe structures for the numerologies that are shown in FIG. 14.

FIG. 15 shows examples of subframe structures for the numerologies 1501 that are shown in FIG. 14. Given that a slot 283 includes $N^{DL}_{symb}$ (or $N^{UL}_{symb}$)=7 symbols, the slot length of the i+1-th numerology 1501 is a half of the one for the i-th numerology 1501, and eventually the number of slots 283 in a subframe (i.e., 1 ms) becomes double. It may be noted that a radio frame may include 10 subframes, and the radio frame length may be equal to 10 ms.

Figure 16:
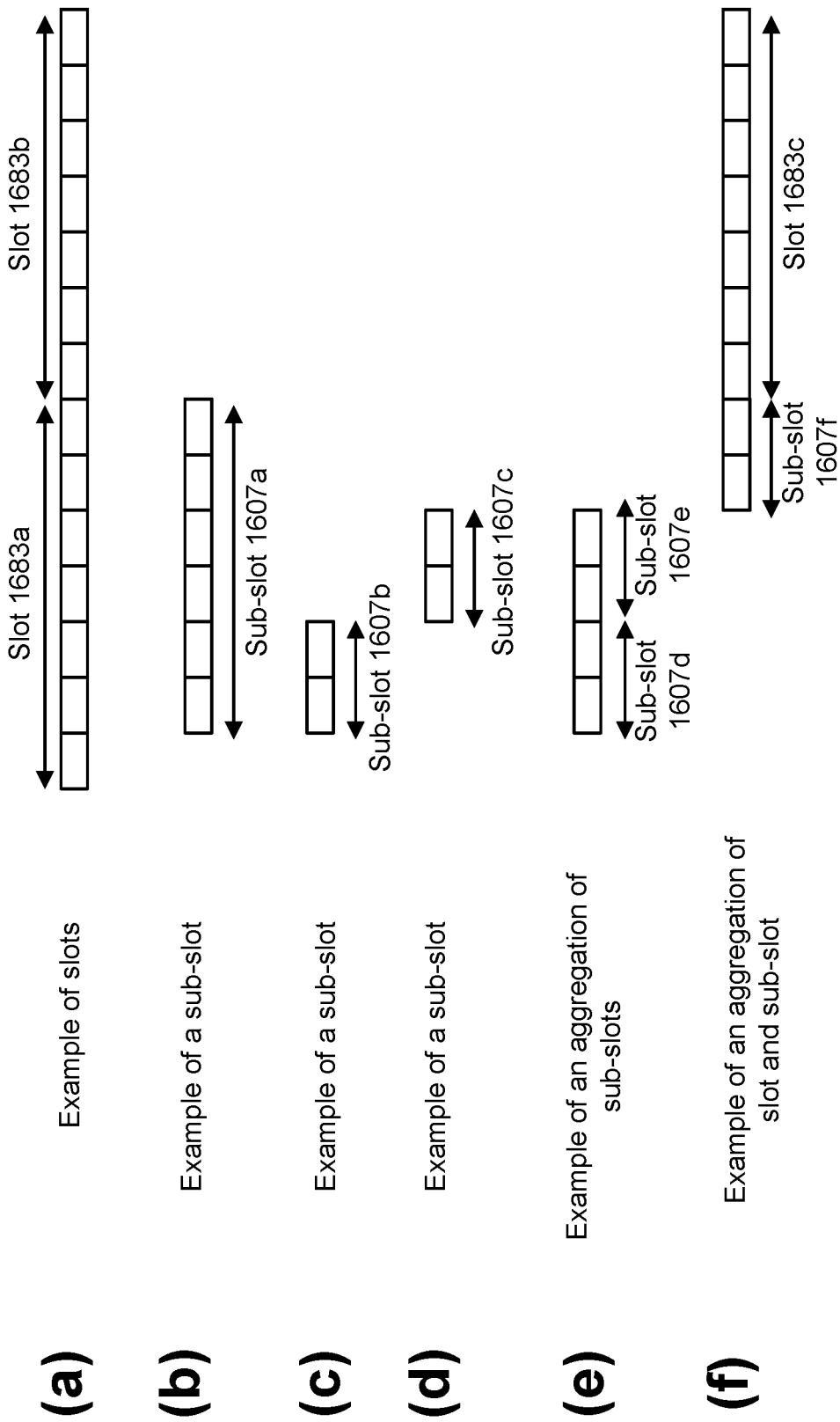
FIG. 16 shows examples of slots and sub-slots.

FIG. 16 shows examples of slots 1683 and sub-slots 1607. If a sub-slot 1607 is not configured by higher layer, the UE 102 and the eNB/gNB 160 may only use a slot 1683 as a scheduling unit. More specifically, a given transport block may be allocated to a slot 1683. If the sub-slot 1607 is configured by higher layer, the UE 102 and the eNB/gNB 160 may use the sub-slot 1607 as well as the slot 1683. The sub-slot 1607 may include one or more OFDM symbols. The maximum number of OFDM symbols that constitute the sub-slot 1607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 1607 may start at any symbol within a slot 1683 unless it collides with a control channel. There could be restrictions of mini-slot length based on restrictions on starting position. For example, the sub-slot 1607 with the length of $N^{DL}_{symb}-1$ (or $N^{UL}_{symb}-1$) may start at the second symbol in a slot 1683. The starting position of a sub-slot 1607 may be indicated by a physical layer control channel (e.g., by DCI format). Alternatively, the starting position of a sub-slot 1607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 1607.

In cases when the sub-slot 1607 is configured, a given transport block may be allocated to either a slot 1683, a sub-slot 1607, aggregated sub-slots 1607 or aggregated sub-slot(s) 1607 and slot 1683. This unit may also be a unit for HARQ-ACK bit generation.

Figure 17:
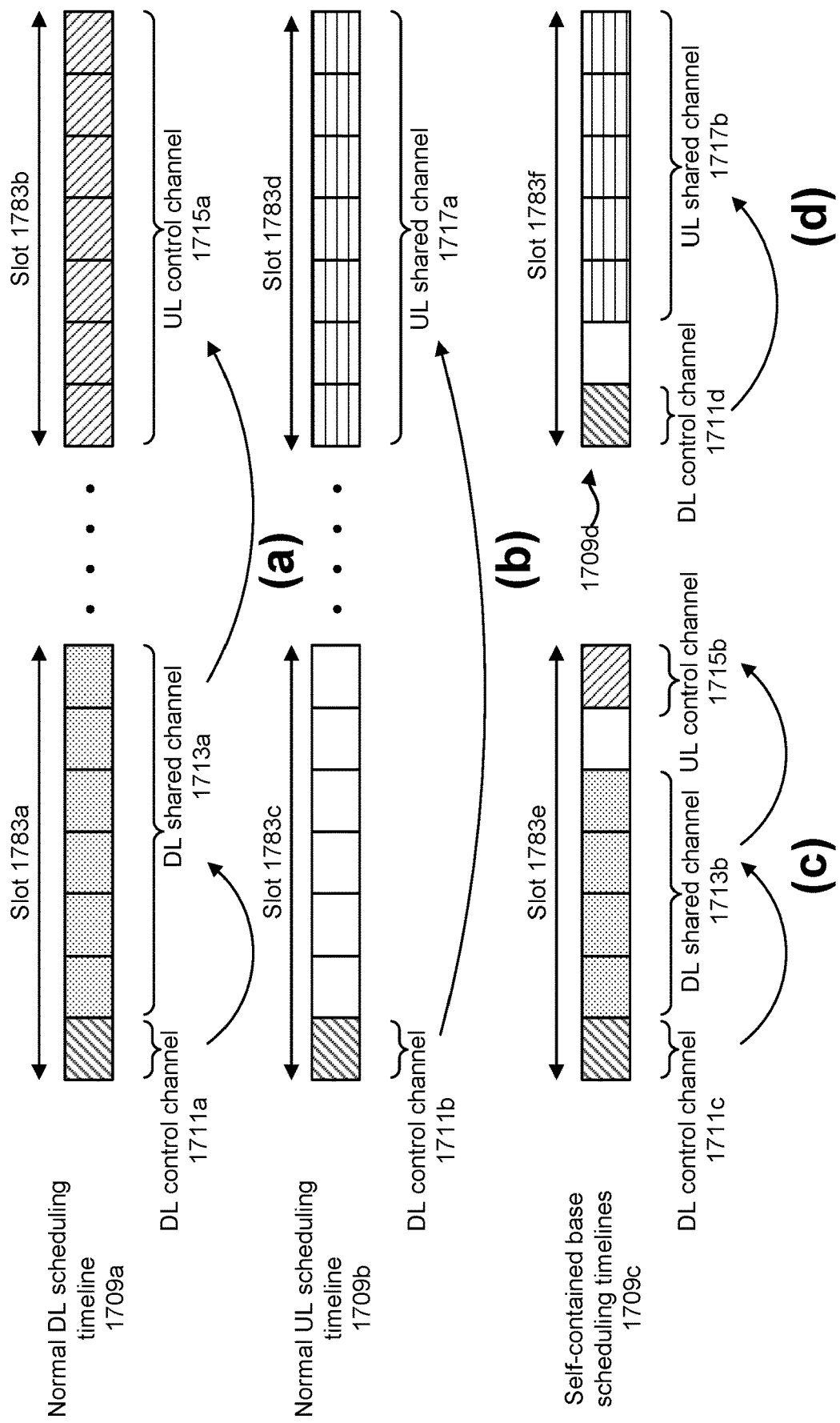
FIG. 17 shows examples of scheduling timelines.

FIG. 17 shows examples of scheduling timelines 1709. For a normal DL scheduling timeline 1709a, DL control channels are mapped the initial part of a slot 1783a. The DL control channels 1711 schedule DL shared channels 1713a in the same slot 1783a. HARQ-ACKs for the DL shared channels 1713a (i.e., HARQ-ACKs each of which indicates whether or not transport block in each DL shared channel 1713a is detected successfully) are reported via UL control channels 1715a in a later slot 1783b. In this instance, a given slot 1783 may contain either one of DL transmission and UL transmission.

For a normal UL scheduling timeline 1709b, DL control channels 1711b are mapped the initial part of a slot 1783c. The DL control channels 1711b schedule UL shared channels 1717a in a later slot 1783d. For these cases, the association timing (time shift) between the DL slot 1783c and the UL slot 1783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 1709c, DL control channels 1711c are mapped to the initial part of a slot 1783e. The DL control channels 1711c schedule DL shared channels 1713b in the same slot 1783e. HARQ-ACKs for the DL shared channels 1713b are reported in UL control channels 1715b, which are mapped at the ending part of the slot 1783e.

For a self-contained base UL scheduling timeline 1709d, DL control channels 1711d are mapped to the initial part of a slot 1783f. The DL control channels 1711d schedule UL shared channels 1717b in the same slot 1783f. For these cases, the slot 1783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 18:
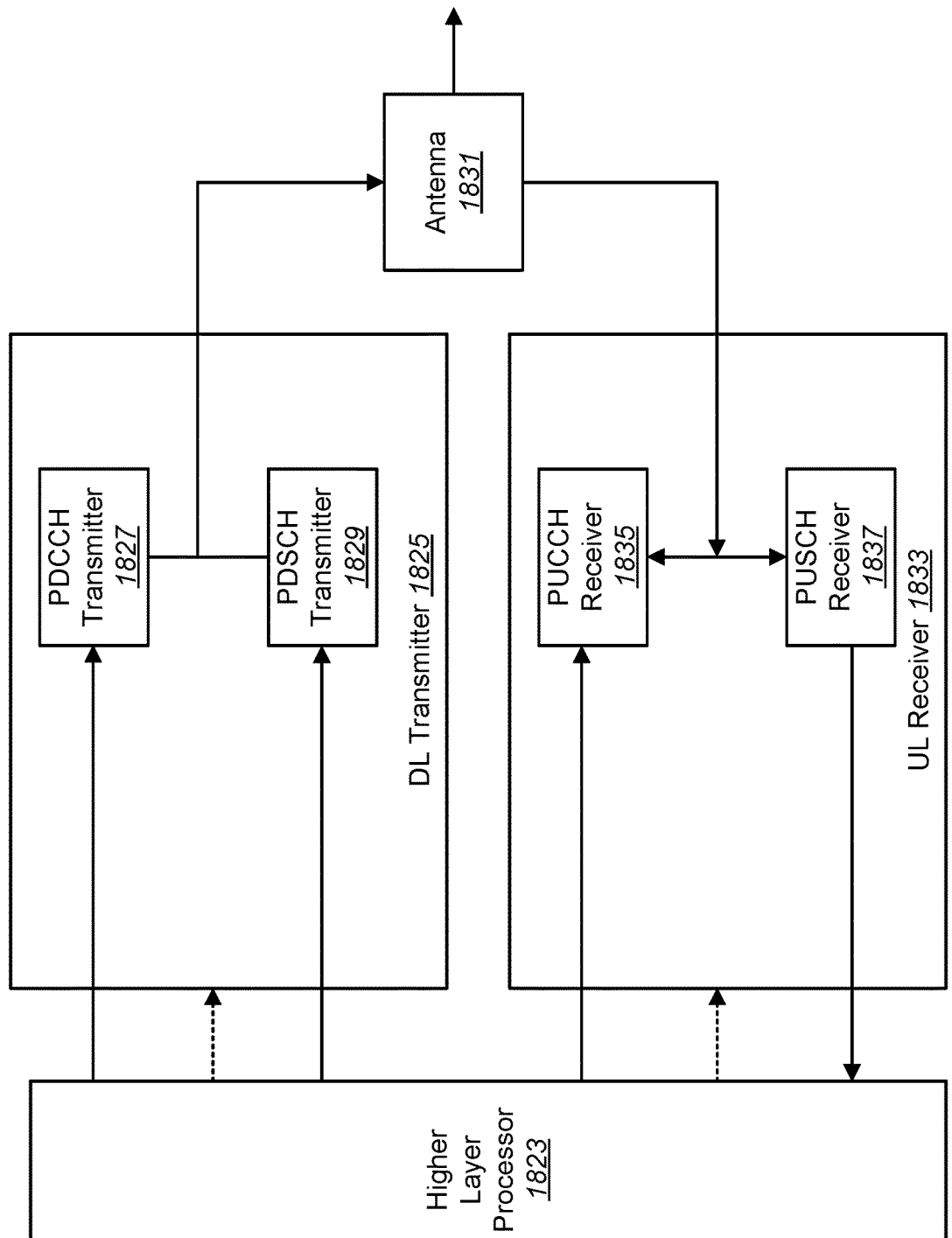
FIG. 18 is a block diagram illustrating one implementation of a gNB.

FIG. 18 is a block diagram illustrating one implementation of an gNB 1860. The gNB 1860 may include a higher layer processor 1823, a DL transmitter 1825, a UL receiver 1833, and one or more antenna 1831. The DL transmitter 1825 may include a PDCCH transmitter 1827 and a PDSCH transmitter 1829. The UL receiver 1833 may include a PUCCH receiver 1835 and a PUSCH receiver 1837.

The higher layer processor 1823 may manage physical layer's behaviors (the DL transmitter's and the UL receiver's behaviors) and provide higher layer parameters to the physical layer. The higher layer processor 1823 may obtain transport blocks from the physical layer. The higher layer processor 1823 may send/acquire higher layer messages such as an RRC message and MAC message to/from a UE's higher layer. The higher layer processor 1823 may provide the PDSCH transmitter transport blocks and provide the PDCCH transmitter transmission parameters related to the transport blocks.

The DL transmitter 1825 may multiplex downlink physical channels and downlink physical signals (including reservation signal) and transmit them via transmission antennas 1831. The UL receiver 1833 may receive multiplexed uplink physical channels and uplink physical signals via receiving antennas 1831 and de-multiplex them. The PUCCH receiver 1835 may provide the higher layer processor 1823 UCI. The PUSCH receiver 1837 may provide the higher layer processor 1823 received transport blocks.

Figure 19:
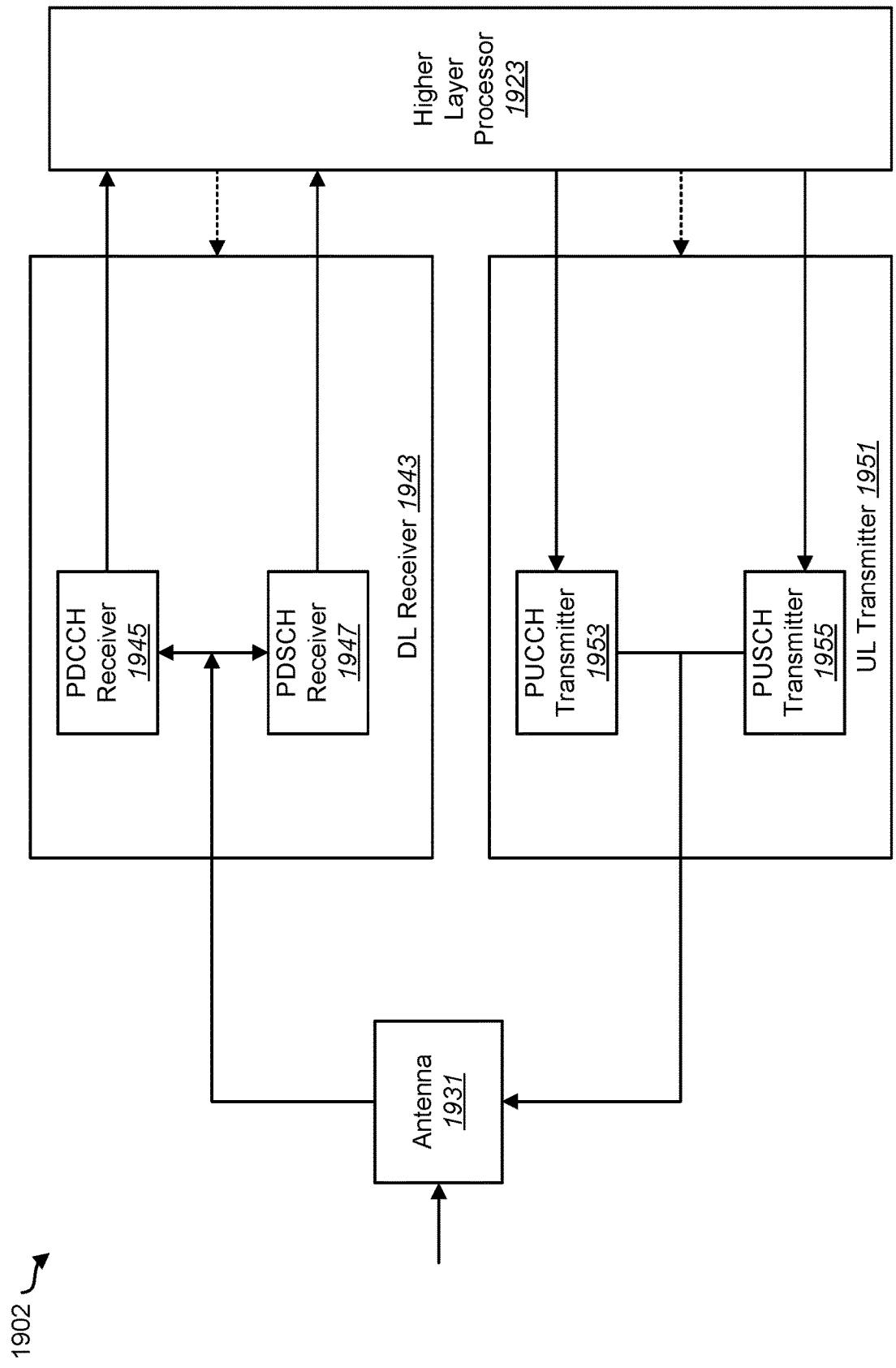
FIG. 19 is a block diagram illustrating one implementation of a UE.

FIG. 19 is a block diagram illustrating one implementation of a UE 1902. The UE 1902 may include a higher layer processor 1923, a UL transmitter 1951, a DL receiver 1943, and one or more antenna 1931. The UL transmitter 1951 may include a PUCCH transmitter 1953 and a PUSCH transmitter 1955. The DL receiver 1943 may include a PDCCH receiver 1945 and a PDSCH receiver 1947.

The higher layer processor 1923 may manage physical layer's behaviors (the UL transmitter's and the DL receiver's behaviors) and provide higher layer parameters to the physical layer. The higher layer processor 1923 may obtain transport blocks from the physical layer. The higher layer processor 1923 may send/acquire higher layer messages such as an RRC message and MAC message to/from a UE's higher layer. The higher layer processor 1923 may provide the PUSCH transmitter transport blocks and provide the PUCCH transmitter 1953 UCI.

The DL receiver 1943 may receive multiplexed downlink physical channels and downlink physical signals via receiving antennas 1931 and de-multiplex them. The PDCCH receiver 1945 may provide the higher layer processor 1923 DCI. The PDSCH receiver 1947 may provide the higher layer processor 1923 received transport blocks.

Figure 20:
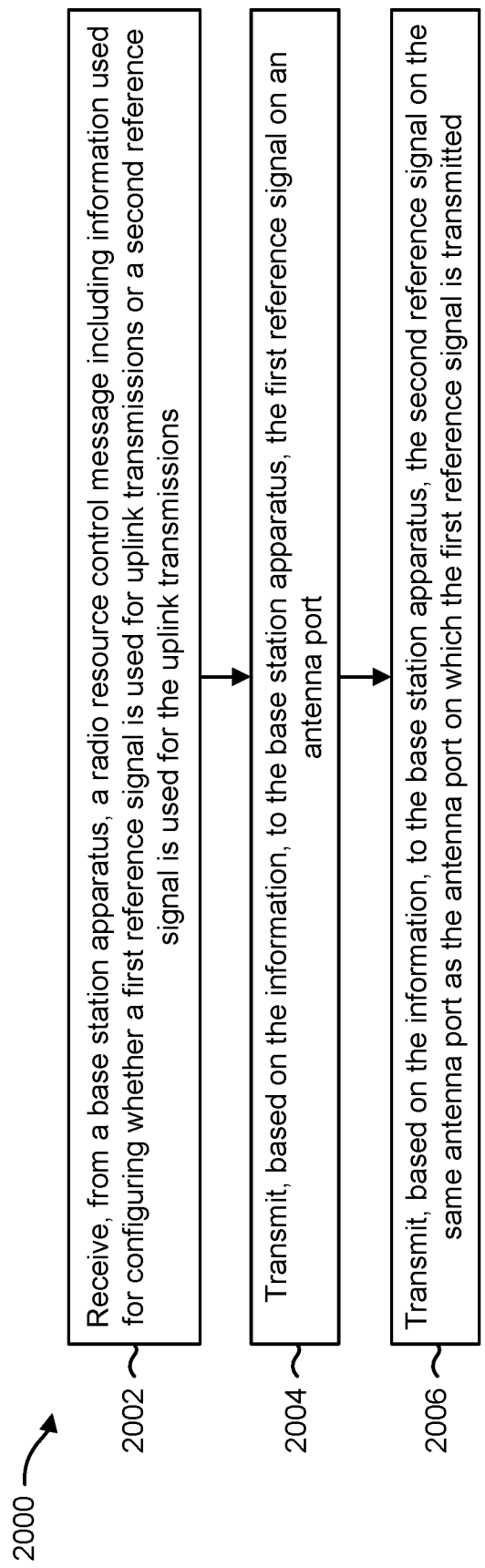
FIG. 20 is a flow diagram illustrating a method of a UE.

FIG. 20 is a flow diagram illustrating a method 2000 of a user equipment (UE) 102. The UE 102 may receive 2002, from a base station apparatus (gNB) 160, a radio resource control message including information used for configuring whether a first reference signal is used for uplink transmissions or a second reference signal is used for the uplink transmissions. The first reference signal may be a demodulation reference signal associated with a physical uplink shared channel. The second reference signal may be a demodulation reference signal associated with a physical uplink shared channel.

The UE 102 may transmit 2004, based on the information, to the gNB 160, the first reference signal on an antenna port.

The UE 102 may transmit 2006, based on the information, to the gNB 160, the second reference signal on the same antenna port as the antenna port on which the first reference signal is transmitted. The second reference signal may be mapped to resource elements in a resource block, which are different from resource elements in a resource block to which the first reference signal is mapped.

A reference signal sequence of the first reference signal and a reference signal sequence of the second reference signal may be generated based on a first value in a case that the first value is configured by using the radio resource control message. The reference signal sequence of the first reference signal and the reference signal sequence of the second reference signal may be generated based on a physical cell identity in a case that no first value is configured by using the radio resource control message.

Figure 21:
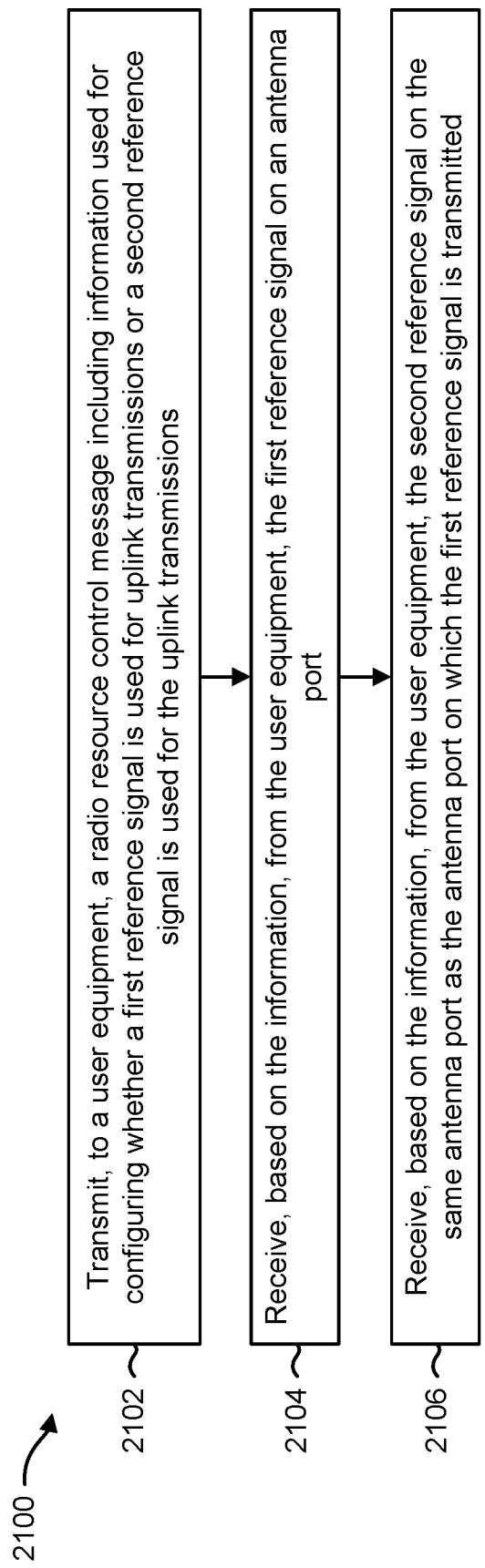
FIG. 21 is a flow diagram illustrating a method of a gNB.

FIG. 21 is a flow diagram illustrating a method 2100 of a base station apparatus (gNB) 160. The gNB 160 may transmit 2102, to a user equipment (UE) 102, a radio resource control message including information used for configuring whether a first reference signal is used for uplink transmissions or a second reference signal is used for the uplink transmissions. The first reference signal may be a demodulation reference signal associated with a physical uplink shared channel. The second reference signal may be a demodulation reference signal associated with a physical uplink shared channel.

The gNB 160 may receive 2104, based on the information, from the UE 102, the first reference signal on an antenna port.

The gNB 160 may receive 2106, based on the information, from the UE 102, the second reference signal on the same antenna port as the antenna port on which the first reference signal is transmitted. The second reference signal may be mapped to resource elements in a resource block, which are different from resource elements in a resource block to which the first reference signal is mapped.

A reference signal sequence of the first reference signal and a reference signal sequence of the second reference signal may be generated based on a first value in a case that the first value is configured by using the radio resource control message. The reference signal sequence of the first reference signal and the reference signal sequence of the second reference signal may be generated based on a physical cell identity in a case that no first value is configured by using the radio resource control message.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semi-conductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A terminal apparatus comprising:
receiving circuitry configured to receive on a physical downlink control channel, from a base station apparatus, a downlink control information (DCI) format comprising first information used for indicating an index of an uplink antenna port, the uplink antenna port being used for transmission of a demodulation reference signal for a physical uplink shared channel, the DCI format being used for scheduling of the physical uplink shared channel; and
transmitting circuitry configured to transmit, to the base station apparatus, the demodulation reference signal for the physical uplink shared channel using the uplink antenna port with the index indicated by the first information, wherein
the demodulation reference signal for the physical uplink shared channel transmitted using the uplink antenna port with the index indicated by the first information is mapped to positions of physical resources within a resource block, and
the positions of physical resources within the resource block is given based on second information provided by using the DCI format comprising the first information.

2. A base station apparatus comprising:
transmitting circuitry configured to transmit on a physical downlink control channel, to a terminal apparatus, a downlink control information (DCI) format comprising first information used for indicating an index of an uplink antenna port, the uplink antenna port being used for transmission of a demodulation reference signal for a physical uplink shared channel, the DCI format being used for scheduling of the physical uplink shared channel; and
receiving circuitry configured to receive, from the terminal apparatus, the demodulation reference signal for the physical uplink shared channel using the uplink antenna port with the index indicated by the first information, wherein
the demodulation reference signal for the physical uplink shared channel transmitted using the uplink antenna port with the index indicated by the first information is mapped to positions of physical resources within a resource block, and
the positions of physical resources within the resource block is given based on second information provided by using the DCI format comprising the first information.

3. A communication method of a terminal apparatus comprising:
receiving on a physical downlink control channel, from a base station apparatus, a downlink control information (DCI) format comprising first information used for indicating an index of an uplink antenna port, the uplink antenna port being used for transmission of a demodulation reference signal for a physical uplink shared channel, the DCI format being used for scheduling of the physical uplink shared channel, and
transmitting, to the base station apparatus, the demodulation reference signal for the physical uplink shared channel using the uplink antenna port with the index indicated by the first information, wherein
the demodulation reference signal for the physical uplink shared channel transmitted using the uplink antenna port with the index indicated by the first information is mapped to positions of physical resources within a resource block, and
the positions of physical resources within the resource block is given based on second information provided by using the DCI format comprising the first information.

4. A communication method of a base station apparatus comprising:
transmitting on a physical downlink control channel, to a terminal apparatus, a downlink control information (DCI) format comprising first information used for indicating an index of an uplink antenna port, the uplink antenna port being used for transmission of a demodulation reference signal for a physical uplink shared channel, the DCI format being used for scheduling of the physical uplink shared channel, and
receiving, from the terminal apparatus, the demodulation reference signal for the physical uplink shared channel using the uplink antenna port with the index indicated by the first information, wherein
the demodulation reference signal for the physical uplink shared channel transmitted using the uplink antenna port with the index indicated by the first information is mapped to positions of physical resources within a resource block, and
the positions of physical resources within the resource block is given based on second information provided by using the DCI format comprising the first information.

* * * * *